(12) United States Patent
Jeong et al.

(10) Patent No.: US 12,518,353 B2
(45) Date of Patent: Jan. 6, 2026

(54) ELECTRONIC DEVICE FOR RECONSTRUCTING IMAGE AND OPERATING METHOD THEREOF

(71) Applicant: SAMSUNG ELECTRONICS CO., LTD., Suwon-si (KR)

(72) Inventors: Youngmo Jeong, Suwon-si (KR); Bonkon Koo, Suwon-si (KR); Jongchul Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 71 days.

(21) Appl. No.: 18/644,928

(22) Filed: Apr. 24, 2024

(65) Prior Publication Data

US 2025/0045879 A1    Feb. 6, 2025

Related U.S. Application Data

(63) Continuation of application No. PCT/KR2024/004765, filed on Apr. 9, 2024.

(30) Foreign Application Priority Data

Aug. 4, 2023   (KR) .................. 10-2023-0102279
Apr. 9, 2024   (KR) .................. 10-2023-0053579

(51) Int. Cl.
*G06T 5/60* (2024.01)
*G06T 5/70* (2024.01)
*H04N 23/95* (2023.01)

(52) U.S. Cl.
CPC .............. *G06T 5/60* (2024.01); *G06T 5/70* (2024.01); *H04N 23/95* (2023.01); *G06T 2207/20081* (2013.01)

(58) Field of Classification Search
CPC ... G06T 5/60; G06T 5/70; G06T 2207/20081; G06T 5/00; G06T 5/73;
(Continued)

(56) References Cited

U.S. PATENT DOCUMENTS 10,170,274 B2 *  1/2019  Stevens ..................... G01T 1/00
10,534,060 B2 *  1/2020  Dannels ................. G01R 33/34
(Continued)

FOREIGN PATENT DOCUMENTS

CN    109884018 A    6/2019
CN    107101974 B    2/2020
(Continued)

OTHER PUBLICATIONS

International Search Report and Written Opinion issued on Jul. 15, 2024 by the International Searching Authority for International Patent Application No. PCT/KR2024/004765 (PCT/ISA/220, PCT/ISA/210, and PCT/ISA/237).
(Continued)

*Primary Examiner* — Chiawei Chen
(74) *Attorney, Agent, or Firm* — Sughrue Mion, PLLC

(57) ABSTRACT

Provided are an electronic device and method for reconstructing an image from a coded image. The electronic device may acquire a coded image, based on light in which a phase is modulated by a first phase mask including noise or a second phase mask not including the noise, and acquire a reconstructed image by inputting the coded image to an artificial intelligence model trained to reconstruct an image. The noise may be an error that occurred according to a process of a phase mask.

20 Claims, 21 Drawing Sheets

(58) Field of Classification Search
CPC .......... G06T 2207/10024; H04N 23/95; H04N 23/54; H04N 23/81; H04N 23/955; G02B 1/00; G06F 30/17; G06F 30/27; G06N 3/08; G06N 3/045; G06N 3/063; G06N 3/082; G06N 3/084; G06N 3/10
See application file for complete search history.

(56) References Cited

U.S. PATENT DOCUMENTS

| | | | |
|---|---|---|---|
| 11,610,925 | B2 | 3/2023 | Fu et al. |
| 12,181,793 | B1* | 12/2024 | Liu .......... G06N 3/045 |
| 12,260,517 | B2 | 3/2025 | Huang et al. |
| 2008/0044103 | A1* | 2/2008 | Dowski .......... G02B 27/46 382/279 |
| 2010/0008597 | A1* | 1/2010 | Findlay .......... G06T 5/73 382/275 |
| 2011/0085051 | A1* | 4/2011 | Chi .......... G02F 1/35 348/222.1 |
| 2014/0369623 | A1 | 12/2014 | Fletcher et al. |
| 2019/0147344 | A1* | 5/2019 | Zhang .......... G06N 3/063 706/25 |
| 2019/0355601 | A1 | 11/2019 | Danen et al. |
| 2021/0314546 | A1 | 10/2021 | Choi et al. |
| 2022/0232148 | A1 | 7/2022 | Song et al. |
| 2022/0272239 | A1 | 8/2022 | Nakamura |
| 2022/0364917 | A1 | 11/2022 | Houck |
| 2023/0401893 | A1 | 12/2023 | Koo et al. |

FOREIGN PATENT DOCUMENTS

| | | |
|---|---|---|
| CN | 110927115 A | 3/2020 |
| CN | 112505911 A | 3/2021 |
| KR | 10-2022-0149416 A | 11/2022 |
| KR | 10-2023-0169822 A | 12/2023 |
| WO | 2022/154623 A1 | 7/2022 |

OTHER PUBLICATIONS

Tseng et al., "Neural nano-optics for high-quality thin lens imaging", Nature Communications, Nov. 29, 2021, 7 total pages, doi:10.1038/s41467-021-26443-0.
Tseng et al., "Differentiable Compound Optics and Processing Pipeline Optimization for End-to-end Camera Design", ACM Transactions on Graphics, Aug. 2021, 18 total pages, vol. 40.
Robidoux et al., "End-to-end High Dynamic Range Camera Pipeline Optimization", IEEE, 2021 IEEE/CVF Conference on Computer Vision and Pattern Recognition (CVPR), Jun. 2021, 11 total pages, doi:10.1109/CVPR46437.2021.00623.
Peng et al., "Learned Large Field-of-View Imaging With Thin-Plate Optics", ACM Transactions on Graphics, Nov. 8, 2019, pp. 1-14, vol. 38, doi:10.1145/3355089.3356526.
Sitzmann et al., "End-to-end optimization of optics and image processing for achromatic extended depth of field and super-resolution imaging", ACM Transactions on Graphics, Jul. 30, 2018, pp. 1-13, doi:10.1145/3197517.3201333.
Lee et al., "Design and single-shot fabrication of lensless cameras with arbitrary point spread functions", Optica, Jan. 10, 2023, pp. 72-80, vol. 10, doi:10.1364/OPTICA.466072.
Extended European Search Report dated Dec. 2, 2025, issued by the European Patent Office in European Application No. 24797319.1.
Dong et al., "Image Restoration Based on Deep Convolutional Network in Wavefront Coding Imaging System", IEEE, 2018 (8 pages total).
Yosef et al., "Video Reconstruction from a Single Motion Blurred Image using Learned Dynamic Phase Coding", arXiv:2112.14768v2 [eess.IV] Dec. 18, 2022, 2022, pp. 1-20 (20 pages total).

* cited by examiner

ELECTRONIC DEVICE FOR RECONSTRUCTING IMAGE AND OPERATING METHOD THEREOF

CROSS-REFERENCE TO RELATED APPLICATION(S)

This application is a bypass continuation of International Application No. PCT/KR2024/004765, filed on Apr. 9, 2024, which is based on and claims priority to Korean Patent Application No. 10-2023-0053579, filed on Apr. 24, 2023, and Korean Patent Application No. 10-2023-0102279, filed on Aug. 4, 2023, filed in the Korean Intellectual Property Office, the disclosures of which are incorporated by reference herein in their entireties.

BACKGROUND

1. Field

The disclosure relates to an electronic device for reconstructing an image, and an operating method of the electronic device. More particularly, the disclosure relates to an electronic device for obtaining a reconstructed image based on an image distorted by a phase mask, and an operating method of the electronic device.

2. Description of Related Art

Augmented reality is a technology that overlays a virtual image on a physical environment space or a real world object in the real world to display them together. Recently, an augmented reality device (e.g., smart glasses) using the augmented reality technology are used in various areas of everyday life. For example, augmented reality devices are used for searching information, directions, photography, etc.

In particular, with the development of an image sensor and artificial intelligence-based image processing technology, the use of a camera has expanded from simple photography to object recognition, biometrics, and information acquisition. Pixel resolution of the camera is continuously increasing according to various uses, but there is a physical limitation on reducing a size and costs of a camera module.

Recently, a lensless imaging technique, which replaces a lens with a thin phase mask is being researched. The phase mask is a very thin optical element for modulating a phase of incident light, and the lensless imaging technique is a scheme for capturing an object by using the thin phase mask that modulates light, instead of a lens. A thickness and a focal length of a lens module may be reduced through the lensless imaging technique, and thus, it is possible to manufacture an ultra-thin camera that exceeds physical limitations of existing cameras.

In the lensless imaging technique, a structure of a phase mask may determine the performance of a camera. Finely curved structures may be differently designed for various phase masks. Efforts have been made to present a deep learning-based image reconstruction network such that coded images acquired through various phase masks may be reconstructed in real time and qualities of reconstructed images may be improved.

SUMMARY

According to an aspect of the disclosure, there is provided an electronic device including: a mask configured to modulate a phase of incident light, the mask including a first mask having a first characteristic or a second mask without the first characteristic, an image sensor configured to receive the light in which the phase is modulated by the first mask or the second mask and at least one processor configured to: acquire a first coded image based on the first mask, or acquire a second coded image based on the second mask; and acquire a reconstructed image by inputting the first coded image or the second coded image to an artificial intelligence model trained to reconstruct an image, wherein the first characteristic is related to a process error related to the first mask.

The first mask may include a first first mask or a second first mask, and the at least one processor may be further configured to: acquire a first first coded image based on the first first mask or acquire a second first coded image based on the second first mask, the first first mask having a first noise and the second first mask having a second noise different from the first noise; and acquire the reconstructed image by inputting the first first coded image or the second first coded image to the artificial intelligence model.

The first characteristic may include assembly noise related to an error corresponding to misarrangement of the first mask or manufacture noise related to an error corresponding to a structural defect of the first mask.

The assembly noise may correspond to an error value from a set reference value, related to at least one of a center position or an inclination of the first mask.

The first mask may include a substrate and a diffraction optical element including a plurality of rods extending perpendicular from the substrate, and the manufacture noise may correspond to an error value from a set reference value, related to at least one of lengths or widths of the plurality of rods.

The first mask may include a meta lens in which nano structures are arranged in two dimensions, and the manufacture noise may correspond to an error value from a set reference value, related to at least one of shapes or an arrangement of the nano structures.

The first characteristic may further include focus noise corresponding to an error in a distance between the first mask and an object, which reflected the light incident on the first mask.

The first characteristic may further include interval noise related to an error in a distance between the first mask and the image sensor.

The at least one processor may be further configured to acquire a feature point by inputting the acquired first coded image or the second coded image to a feature point extraction model trained to extract the feature point.

The at least one processor may be further configured to train the artificial intelligence model by: acquiring an input image; acquire a training coded image corresponding to the input image by simulating distribution of light transmitted through the first mask including the first characteristic; acquire a training reconstructed image, based on the training coded image; and update a parameter of the artificial intelligence model by calculating a loss function related to a difference between the training reconstructed image and the input image.

According to another aspect of the disclosure, there is provide an operating method of an electronic device, the operating method including: acquiring a first coded image based on a first mask, or acquiring a second coded image based on a second mask, the first mask having a first characteristic, and the second mask without the first characteristic, the first mask or the second mask configured to modulate a phase of incident light; and acquiring a reconstructed image by inputting the first coded image or the second coded image to an artificial intelligence model trained to reconstruct an image, wherein the first characteristic is related to a process error related to the first mask.

DESCRIPTION OF DRAWINGS

The disclosure may be easily understood by a combination of the following detailed descriptions and accompanying drawings, and reference numerals refer to structural elements.

DETAILED DESCRIPTION

Figure 1:
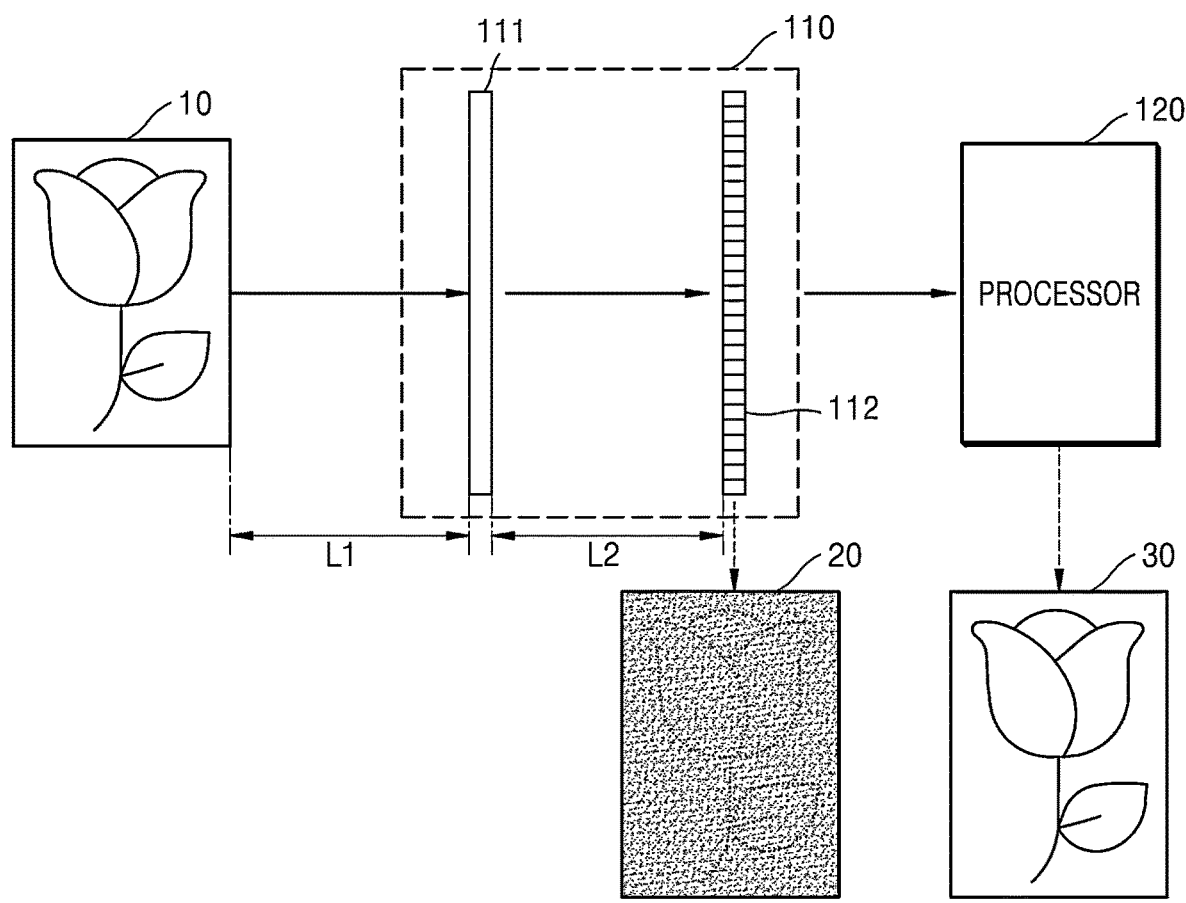
FIG. 1 is a conceptual diagram showing an operation of an electronic device according to an embodiment of the disclosure.

All terms including descriptive or technical terms which are used herein should be construed as having meanings that are obvious to one of ordinary skill in the art. However, the terms may have different meanings according to the intention of one of ordinary skill in the art, precedent cases, or the appearance of new technologies. Also, some terms may be arbitrarily selected by the applicant, and in this case, the meaning of the selected terms will be described in detail in the detailed description of an embodiment of the disclosure. Thus, the terms used herein have to be defined based on the meaning of the terms together with the description throughout the specification.

An expression used in the singular may encompass the expression in the plural, unless it has a clearly different meaning in the context. Terms used herein, including technical or scientific terms, may have the same meaning as commonly understood by one of ordinary skill in the art described in the disclosure.

In an example case in which a part "includes" or "comprises" an element, unless there is a particular description contrary thereto, the part may further include other elements, rather than excluding the other elements. In addition, terms such as "unit (or -er/or)" and "module" described in the specification denote a unit that processes at least one function or operation, which may be implemented in hardware or software, or implemented in a combination of hardware and software. Throughout the disclosure, the expression "at least one of a, b or c" indicates only a, only b, only c, both a and b, both a and c, both b and c, all of a, b, and c, or variations thereof.

The expression "configured to" used in the disclosure may be replaced by, for example, suitable for", "having the capacity to", "designed to", "adapted to", made to", or "capable of", according to situations. The expression "configured to" may not necessarily indicate "specifically designed to" in terms of hardware. Instead, in a certain situation, the expression "system configured to" may indicate that the system may be "capable of" together with another device or components. For example, "a processor configured to perform A, B, and C" may indicate a dedicated processor (e.g., an embedded processor) for performing corresponding operations or indicate a generic-purpose processor (e.g., a central processing unit (CPU) or an application processor) performing the corresponding operations by executing one or more software programs stored in a memory.

Also, in the disclosure, it will be understood that when one element is "connected" or "coupled" to another element, the elements may be directly connected or coupled to each other, but may alternatively be connected or coupled to each other with an intervening element therebetween, unless specified otherwise.

Hereinafter, an embodiment of the disclosure will be described in detail with reference to the accompanying drawings such that one of ordinary skill in the art may easily implement the embodiment of the disclosure. However, the disclosure may be implemented in various different forms and is not limited to the embodiment of the disclosure described herein.

Hereinafter, embodiments of the disclosure will be described in detail with reference to accompanying drawings.

FIG. 1 is a conceptual diagram showing an operation of an electronic device according to an embodiment of the disclosure. For example, FIG. 1 illustrates an operation in which the electronic device may acquire a reconstructed image by using a phase mask, according to an embodiment of the disclosure.

Referring to FIG. 1, the electronic device may include an optical system 110 and a processor 120. The optical system 110 may include a phase mask 111 and an image sensor 112. However, the disclosure is not limited thereto, and as such, the optical system 110 may include other elements.

According to an embodiment of the disclosure, the optical system 110 may be a camera module including the phase mask 111 and the image sensor 112. The optical system 110 may capture an image of an object 10. The optical system 110 may be configured to acquire coded image 20 of the object 10 as a captured image, in a case in which a phase of light reflected from the object 10 is modulated by the phase mask 111.

According to an embodiment of the disclosure, the phase mask 111 may be configured to modulate a phase of incident light. For example, light may be incident on the phase mask 111, and a phase of the incident light may be modulated by the phase mask 111. For example, the light reflected from the object 10 located in front of the phase mask 111 may be incident on the phase mask 111. The phase of the incident light may be modulated according to characteristics of the phase mask 111. For example, the incident light may be refracted by the phase mask 111. In some cases, the phase mask 111 may be referred to as a mask. In some embodiments, the mask is not limited to modulating a phase of incident light, and as such, the mask may be configured to alter the incident light in another manner.

According to an embodiment of the disclosure, the optical system 110 may further include a light source. The light source may output light. The light source may output light towards the object 10. The light output from the light source may be reflected by the object 10 located in front of the phase mask 111. The light reflected by the object 10 may be incident on the phase mask 111, and a phase of the incident light may be modulated by the phase mask 111.

According to an embodiment of the disclosure, the phase mask 111 may be a diffraction optical element or a meta lens. The diffraction optical element and the meta lens may be distinguished according to a scale of a structure on a substrate. The diffraction optical element and the meta lens may be a phase mask in which a certain pattern is formed and may be manufactured by an exposing process in which exposure light is irradiated on a substrate where a photosensitive layer is formed to generate a pattern.

The diffraction optical element may be a phase mask in which rods of a relatively large scale are formed on a substrate. The diffraction optical element may include a pattern formed by a plurality of rods. A phase of transmitted light may be modulated according to the pattern of the diffraction optical element. A pattern formed on the diffraction optical element will be described in detail below with reference to FIG. 4.

The meta lens may be a lens in which nano structures of a relatively small scale are arranged in two dimensions. The meta lens may include a surface including a plurality of nano structures arranged on a substrate, and a phase of transmitted light may be modulated according to an arrangement and shapes of the nano structures. For example, optical characteristics of the meta lens may vary according to one or more of heights, shapes, arrangements, and properties of the nano structures formed on the meta lens. The nano structures formed on the meta lens will be described in detail below with reference to FIG. 5.

According to an embodiment of the disclosure, the phase mask 111 may be configured as a first phase mask (e.g., a phase mask 760 of FIG. 7B) including noise or a second phase mask (e.g., a phase mask 710 of FIG. 7A) not including noise. For example, the phase mask 111 may be the first phase mask including noise or the second phase mask without noise.

According to an embodiment, the first phase mask is a phase mask that includes noise because of an error that occurred during a process related to the phase mask, and the second phase mark is a phase mask that does not include noise because an error does not occur during a process related the phase mask. For example, an error according to a process may include an assembly error, a manufacture error, or the like, which may occur in relation to a phase mask during a process of manufacturing an optical system including the phase mask. However, the disclosure is not limited thereto, and as such, according to another embodiment, an error may occur to the phase mask during another process.

According to an embodiment of the disclosure, the phase mask 111 may be the first phase mask.

According to an embodiment of the disclosure, the first phase mask may include noise that is an error that occurred during a process of the first phase mask. The noise may include assembly noise related to an error that occurred according to misarrangement or misconfiguration of the first phase mask in the optical system 110. The noise may include manufacture noise related to an error that occurred due to a structural defect of the first phase mask.

The assembly noise may be an error value from a set reference value, related to at least one of a center position or an inclination of the first phase mask. For example, the assembly noise may include an error that occurred in a case in which the first phase mask in the optical system 110 is assembled by being inclined by a certain angle with respect to a correct position. As another example, the assembly noise may include an error that occurred in a case in which the first phase mask in the optical system 110 is assembled by being spaced apart from a correct position by a certain interval.

The manufacture noise may be an error value from a set reference value, related to at least one of lengths or widths of a plurality of rods. For example, the first phase mask may be a diffraction optical element including the plurality of rods extending perpendicular to a substrate, on the substrate. The manufacture noise may include an error that occurred in a case in which heights of the plurality of rods are less than a reference height. For reference, the rods are will be described below with reference to FIGS. 4 and 6, through enlarged diagrams of a phase mask.

The manufacture noise may be an error value from a set reference value, related to at least one of shapes or an arrangement of nano structures. For example, the first phase mask may be a meta lens including a plurality of nano structures extending perpendicular to a substrate, on the substrate. The manufacture noise may include an error that occurred in a case in which shapes of the plurality of nano structures are manufactured differently from a reference shape. For reference, the nano structures will be described below with reference to FIG. 5, through enlarged diagrams of a meta lens.

According to an embodiment of the disclosure, the noise may include focus noise related to an error in a distance between the first phase mask and the object 10. An artificial intelligence model trained to reconstruct an image may be a model trained to acquire a reconstructed image, based on the object 10 spaced apart from the first phase mask by a first distance L1. A difference between an actual distance between the first phase mask and the object 10, and the first distance L1 may denote the focus noise. The artificial intelligence model may be a model trained to acquire the reconstructed image of the object 10 spaced apart from the first phase mask by the actual distance between the first phase mask and the object 10, taking into account the focus noise.

According to an embodiment of the disclosure, the noise may include interval noise related to an error in the distance between the first phase mask and the image sensor 112. An artificial intelligence model trained to reconstruct an image may be a model trained to acquire a reconstructed image, based on a design of the optical system 110 in which the first phase mask and the image sensor 112 are spaced apart from each other by a second distance L2. A difference between an actual distance between the first phase mask and the image sensor 112, and the second distance L2 may denote the interval noise. The artificial intelligence model may be a model trained to acquire the reconstructed image through the optical system 110 in which the first phase mask and the image sensor 112 are spaced apart from each other by the actual distance between the first phase mask and the image sensor 112, taking into account the interval noise.

According to an embodiment of the disclosure, the phase mask 111 may be the second phase mask. The second phase mask may not include noise.

According to an embodiment of the disclosure, the electronic device may acquire the coded image 20 by receiving light transmitted through the phase mask 111, by using the image sensor 112. The electronic device may acquire the coded image 20 corresponding to the object 10, based on distribution of light transmitted through the phase mask 111 including noise. The light transmitted through the phase mask 111 may be light that is output from the light source and reflected by the object 10. The electronic device may acquire a first coded image, based on light in which a phase is modulated by the first phase mask and received by the image sensor 112. The electronic device may acquire a second coded image, based on light in which a phase is modulated by the second phase mask and received by the image sensor 112. The electronic device may acquire the first coded image or the second coded image.

For example, as shown in FIG. 1, light transmitted through the phase mask 111 may be light reflected from a rose. As another example, light transmitted through the phase mask 111 may be light reflected from an eye. Light reflected from the object 10 may reach the phase mask 111, and a path of the light may be changed by the phase mask 111, and thus, a phase of the light may be modulated.

The light in which the phase is modulated is received by the image sensor 112. For example, the image sensor 112 may be a two-dimensional sensor assembled in the form of an array including a plurality of pixels arranged in a matrix, and each of the plurality of pixels may include at least one photoelectric transformation element. The image sensor 112 may detect light by using the photoelectric transformation element, and output an image signal that is an electric signal according to the detected light. The electronic device may acquire the coded image 20 by converting the light received through the image sensor 112 into an electric signal.

The coded image 20 may vary according to at least one of the object from which light is reflected or a pattern of the phase mask 111. In general, it may be difficult to identify an object represented in the coded image 20 in which a phase is modulated by the phase mask 111, with naked eyes.

According to an embodiment of the disclosure, the electronic device may acquire a reconstructed image 30 from the coded image 20. The electronic device may acquire the reconstructed image 30 by inputting the acquired coded image 20 into an artificial intelligence model. The artificial intelligence model may be a model trained to reconstruct an image. The artificial intelligence model may be a model trained to reconstruct a coded image generated based on the phase mask 111. For example, the reconstructed image 30 may be acquired taking into account noise generated according to a process related to the first phase mask.

According to an embodiment of the disclosure, the electronic device may acquire a first coded image, based on the first phase mask or acquire a second coded image, based on the second phase mask. The electronic device may acquire the reconstructed image 30 by inputting the first coded image or the second coded image to the artificial intelligence model trained to reconstruct an image.

An error may occur during an assembly process of a phase mask in an optical system or an error may occur during a manufacture process of the phase mask, according to a process related to the phase mask. The electronic device according to an embodiment of the disclosure may acquire the same reconstructed image 30 from the coded image 20 encoded according to various types of noise, by using an artificial intelligence model trained based on noise that is an error that occurred according to a process of a phase mask. The electronic device according to an embodiment of the disclosure may acquire the reconstructed image 30 from a coded image that is encoded by being transmitted through the second phase mask not including noise, by using the artificial intelligence model. Thus, the electronic device according to an embodiment of the disclosure may consistently acquire the reconstructed image 30 regardless of a process error related to the phase mask 111.

Figure 2:
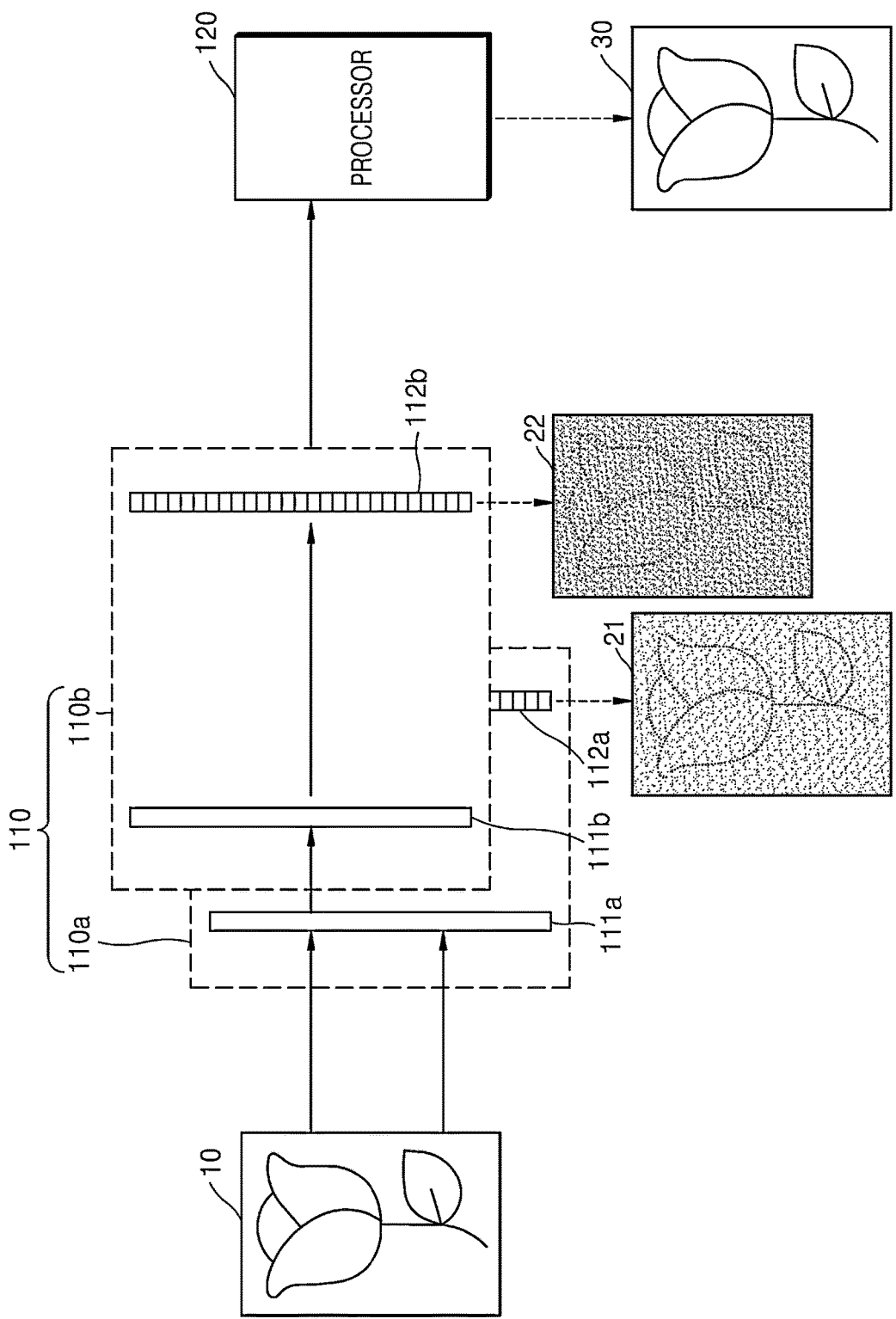
FIG. 2 is a conceptual diagram showing an operation of an electronic device according to another embodiment of the disclosure.

FIG. 2 is a conceptual diagram showing an operation of an electronic device according to an embodiment of the disclosure. For example, FIG. 1 illustrates an operation by which the electronic device may acquire a reconstructed image based one or more of a plurality of first phase masks including noise, according to an embodiment of the disclosure.

Referring to FIG. 2, the optical system 110 may include a first optical system 110a and a second optical system 110b according to an embodiment of the disclosure. The first optical system 110a includes a 1_1 phase mask 111a and a first image sensor 112a, and the second optical system 110b includes a 1_2 phase mask 111b and a second image sensor 112b. The 1_1 phase mask 111a and the 1_2 phase mask 111b may be different from each other according to a process error related to the respective phase mask. For example, both the 1_1 phase mask 111a and the 1_2 phase mask 111b may include noise, but the noise may be different from each other.

For convenience of description, the optical system 110 shown in FIG. 2 includes the first phase mask, but the first phase mask may be replaced by the second phase mask not including noise.

According to an embodiment of the disclosure, noise that is an error that occurred according to a process related to the phase mask 111 may be generated at the time of manufacturing the optical system 110. According to an embodiment of the disclosure, an artificial intelligence model may be a model trained to acquire a reconstructed image from a coded image, taking into account the noise generated according to a process related to the phase mask 111, by setting a range of considerable noise. The set range of noise may vary according to various objectives or goals. For example, the electronic device may, by using the artificial intelligence model, reconstruct a coded image by a phase mask in which process errors are various, to minimum (or low) quality, in a case in which the set range of noise is wide, and reconstruct a coded image of a narrow range to high quality in a case in which the set range is narrow. However, the disclosure is not limited by the setting of the range of considerable noise. The first phase mask including noise may include the 1_1 phase mask 111a and the 1_2 phase mask 111b. The 1_1 phase mask 111a and the 1_2 phase mask 111b may denote phase masks manufactured within the set range of noise.

The 1_1 phase mask 111a may include a first noise and the 1_2 phase mask 111b may include a second noise. A pattern formed on the 1_1 phase mask 111a and a pattern formed on the 1_2 phase mask 111b may be distinguished from each other by a difference between the first noise and the second noise, which are generated according to a process related to the 1_1 phase mask 111a or the 1_2 phase mask 111b. For example, a design error may occur in a case in which height differences or an arrangement of rods included in a phase mask are not manufactured as designed. Accordingly, light perpendicularly incident on the 1_1 phase mask 111a may be refracted by a first degree (e.g., 25°) and light perpendicularly incident on the 1_2 phase mask 111b may be refracted by a second degree (e.g., 26°), according to an error that occurred according to a process of a phase mask.

The electronic device may acquire a first coded image 21 by converting, to an electric signal, light in which a phase is modulated by the 1_1 phase mask 111a including the first noise and received through the first image sensor 112a. The electronic device may acquire a second coded image 22 by converting, to an electric signal, light in which a phase is modulated by the 1_2 phase mask 111b including the second noise and received through the second image sensor 112b. The first coded image 21 may be different from the second coded image 22. In other words, the electronic device may acquire the first coded image 21, based on the light in which the phase is modulated by being transmitted through the 1_1 phase mask 111a or acquire the second coded image 22, based on the light in which the phase is modulated by being transmitted through the 1_2 phase mask 111b.

According to an embodiment of the disclosure, the electronic device may reconstruct an image, based on light in which a phase is modulated by the phase mask 111 including arbitrary noise generated according to a process of a phase mask, by using the trained artificial intelligence model. The electronic device may acquire the reconstructed image 30 from the first and second coded images 21 and 22 acquired based on the light in which the phase is modulated by the 1_1 and 1_2 phase masks 111a and 111b including the arbitrary noise, by using the trained artificial intelligence model. The electronic device may acquire the reconstructed image 30 by inputting the first coded image 21 or the second coded image 22 to the artificial intelligence model.

For example, noise generated according to a process of the 1_1 phase mask 111a and noise generated according to a process of the 1_2 phase mask 111b may be different from each other. The electronic device may acquire the reconstructed image 30, based on the first coded image 21 acquired based on the 1_1 phase mask 111a, by using the trained artificial intelligence model. Also, the electronic device may acquire the reconstructed image 30, based on the second coded image 22 acquired based on the 1_2 phase mask 111b, by using the trained artificial intelligence model. The electronic device may consistently acquire the reconstructed image 30, based on the first coded image 21 or the second coded image 22. However, the disclosure is not limited thereto, and as such, according to another embodiment, the electronic device may acquire the reconstructed image 30, based on the first coded image 21 and the second coded image 22. For example, the reconstructed image 30 may be generated by taking into account the first coded image 21 and the second coded image 22.

According to an embodiment of the disclosure, the electronic device may reconstruct an image, based on light transmitted through the second phase mask not including arbitrary noise generated according to a process of a phase mask, by using the trained artificial intelligence model. The electronic device may acquire the reconstructed image 30 from the first and second coded images 21 and 22 acquired based on the light transmitted through the second phase mask not including noise, by using the trained artificial intelligence model.

Figure 3:
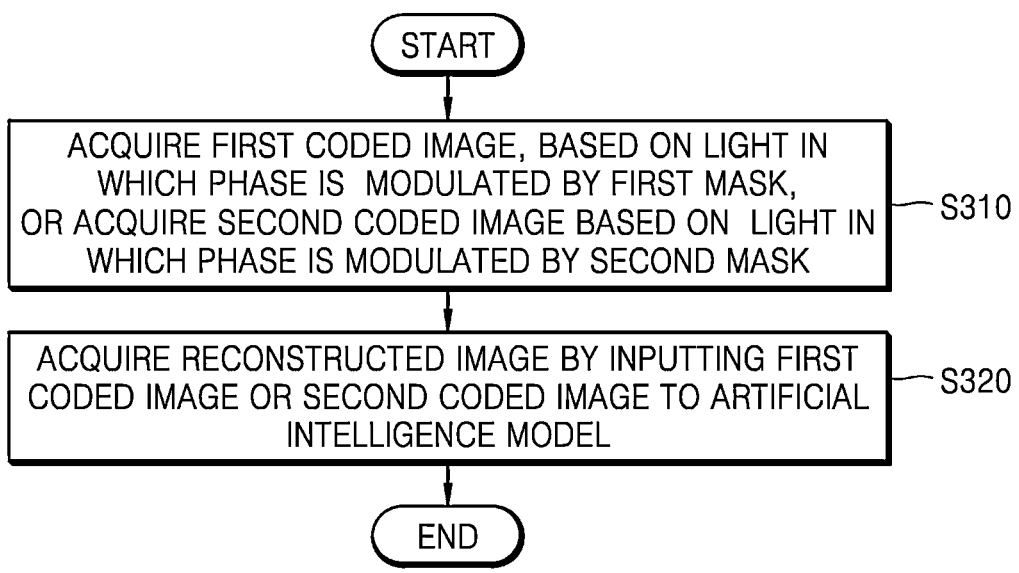
FIG. 3 is a flowchart of an operating method of an electronic device, according to an embodiment of the disclosure.

FIG. 3 is a flowchart of an operating method of an electronic device, according to an embodiment of the disclosure.

For convenience of description, details that overlap those described with reference to FIGS. 1 and 2 will be briefly described or omitted.

Referring to FIG. 3, in operation S310, the method may include acquiring a coded image in which a phase is modulated by a phase mask. For example, the method may including acquiring a first coded image, based on light in which a phase is modulated by a first phase mask, or acquiring a second coded image, based on light in which a phase is modulated by a second phase mask. For example, the electronic device may acquire a coded image in which a phase is modulated by a phase mask. Here, the coded image may be acquired based on light received by an image sensor. The electronic device may acquire a first coded image, based on light in which a phase is modulated by a first phase mask and received by the image sensor, or acquire a second coded image, based on light in which a phase is modulated by a second phase mask and received by the image sensor.

According to an embodiment of the disclosure, the phase mask may be configured as one of the first phase mask including noise and the second phase mask not including the noise.

According to an embodiment of the disclosure, the first phase mask may include noise that is an error that occurred according to a process related to the first phase mask. A phase of light may be modulated when the light is transmitted through the first phase mask, and the phase of the light may be additionally modulated when transmitted through the first phase mask, due to the noise. The phase of the light transmitted through the first phase mask may not be uniformly predicted due to the noise.

For example, the electronic device may include an optical system including the first phase mask and the image sensor. The first phase mask may include an assembly error that occurred according to misarrangement of a phase mask in the optical system. In other words, the noise may include assembly noise related to the assembly error. The first phase mask may include an error of being assembled by being spaced apart in a first direction or an error of being assembled by being rotated by a first angle, based on a position of being normally assembled in the optical system.

The assembly errors of the first phase mask will be described in detail below with reference to FIGS. 7A to 7C.

As another example, the first phase mask may include a manufacture error related to a structural defect of a phase mask. In other words, the noise may include manufacture noise related to the manufacture error. The first phase mask may be a diffraction optical element including a substrate and a plurality of rods extending perpendicular to a top surface of the substrate, on the substrate, or a meta lens in which nano structures are arranged in two dimensions.

In an example case in which the first phase mask is the diffraction optical element, the first phase mask may include a manufacture error because lengths and widths of the plurality of rods are not uniformly manufactured. In an example case in which the first phase mask is the meta lens, the first phase mask may include a manufacture error because shapes and/or an arrangement of the nano structures are not uniformly manufactured.

The manufacture errors of the first phase mask will be described in detail below with reference to FIGS. 8A to 8E, 9A, and 9B.

According to an embodiment of the disclosure, the electronic device may acquire light transmitted through the first phase mask including noise, by using an image sensor. The electronic device may acquire a distribution of the light transmitted through the first phase mask including noise related to an error that occurred according to a process related to the first phase mask. The electronic device may acquire the distribution of light through the image sensor.

The electronic device may acquire the first coded image, based on light in which a phase is modulated by the first phase mask and received by the image sensor. The electronic device may acquire the first coded image, based on the distribution of light.

According to an embodiment of the disclosure, the second phase mask may not include noise. A phase of light may be modulated when the light is transmitted through the second phase mask. The electronic device may acquire the light transmitted through the second phase mask, by using the image sensor. The electronic device may acquire the second coded image, based on light in which a phase is modulated by the second phase mask and received by the image sensor. The electronic device may acquire the second coded image, based on the distribution of light.

In operation S320, the method may include acquiring a reconstructed image by inputting a coded image to an artificial intelligence model trained to reconstruct an image. For example, the electronic device may acquire a reconstructed image by inputting a coded image to an artificial intelligence model trained to reconstruct an image.

According to an embodiment of the disclosure, the artificial intelligence model may be a model trained to reconstruct an image. The electronic device may input the coded image, based on light in which a phase is modulated by a phase mask, by using the artificial intelligence model, and acquire the reconstructed image as an output.

According to an embodiment of the disclosure, the artificial intelligence model may be a model trained to reconstruct a coded image generated by the phase mask. For example, the reconstructed image may be acquired by taking into account noise generated according to a process related to the phase mask. The electronic device may input the coded image to the artificial intelligence model, based on the light in which the phase is modulated by the phase mask, and acquire the reconstructed image as the output.

According to an embodiment of the disclosure, the phase mask may be configured as one of the first phase mask and the second phase mask.

According to an embodiment of the disclosure, the electronic device may input, to the artificial intelligence model, the first coded image acquired based on the first phase mask including the noise, and acquire the reconstructed image as the output. The electronic device may input, to the artificial intelligence model, the second coded image acquired based on the second phase mask not including the noise, and acquire the reconstructed image as the output.

According to an embodiment of the disclosure, the electronic device may acquire the reconstructed image by inputting, to the artificial intelligence model, the first coded image acquired based on the light transmitted through the first phase mask or the second coded image acquired based on the light transmitted through the second phase mask.

Figure 4:
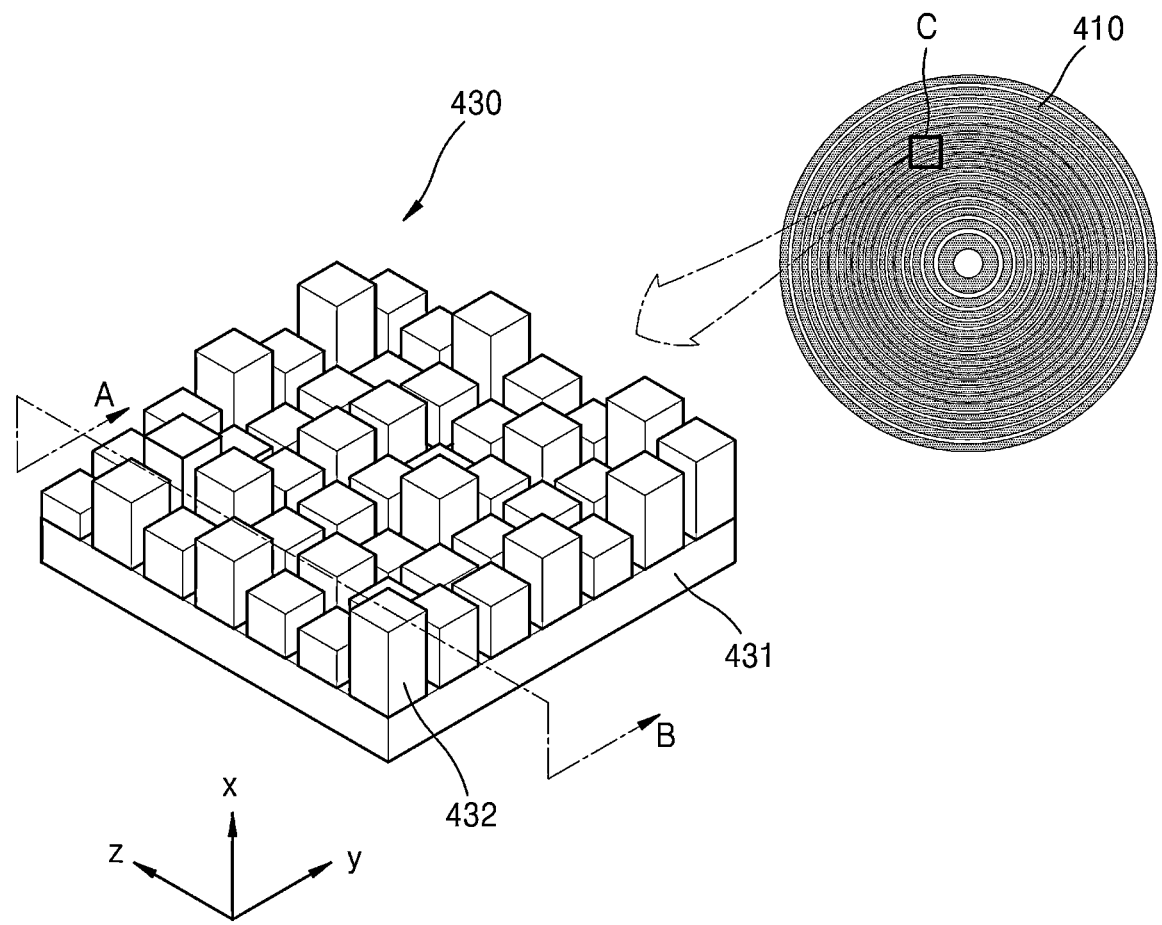
FIG. 4 is a diagram for describing a phase mask according to an embodiment of the disclosure.

FIG. 4 is a diagram for describing a phase mask according to an embodiment of the disclosure.

According to an embodiment of the disclosure, an electronic device may modulate a phase of light incident in a first direction x, by using the phase mask. For example, the phase mask may be a diffraction optical element 430. However, the disclosure is not limited to, and as such, according to another embodiment, the electronic device may modulate a phase of light incident in a direction opposite to the first direction x, by using the phase mask.

Referring to FIG. 4, according to an embodiment of the disclosure, the phase mask may be a diffraction optical element 410. The diffraction optical element 410 may have, for example, a pattern in circles. The diffraction optical element 410 may have a pattern in which a uniform form is regularly repeated. In other words, the diffraction optical element 410 may have a concentric pattern in which circular patterns having different sizes of radii are repeated.

However, a form of a pattern of the diffraction optical element 410 shown in FIG. 4 is only an example, and the disclosure is not limited thereto. For example, the diffraction optical element 410 may have a pattern in quadrangles. The diffraction optical element 410 may have a pattern in which rectangles are repeated.

For convenience of description, the diffraction optical element 430 obtained by enlarging a region C of the diffraction optical element 410 will be described. According to an embodiment of the disclosure, the diffraction optical element 430 may include a substrate 431 and a plurality of rods 432.

The substrate 431 may extend in a second direction y perpendicular to the first direction x, and a third direction z perpendicular to the first direction x. The substrate 431 may be formed on a plane extending in the second direction y and the third direction z.

The plurality of rods 432 may be arranged on the substrate 431. The plurality of rods 432 may extend perpendicular to a top surface of the substrate 431. The plurality of rods 432 may extend in the first direction x. As shown in FIG. 4, the plurality of rods 432 may include rectangular parallelepiped pillars. The plurality of rods 432 may be spaced apart from each other at certain intervals.

In FIG. 4, heights of the plurality of rods 432 are irregular, but the disclosure is not limited thereto. For example, the plurality of rods 432 may be arranged such that a first height and a second height are regularly repeated.

The plurality of rods 432 included in the diffraction optical element 430 may guide light incident on an optical system to an arbitrary focus, according to heights and a pattern thereof. Here, the "heights and pattern" denote height differences of the plurality of rods 432 and a shape of a pattern on the diffraction optical element 430 according to the height differences.

Figure 5:
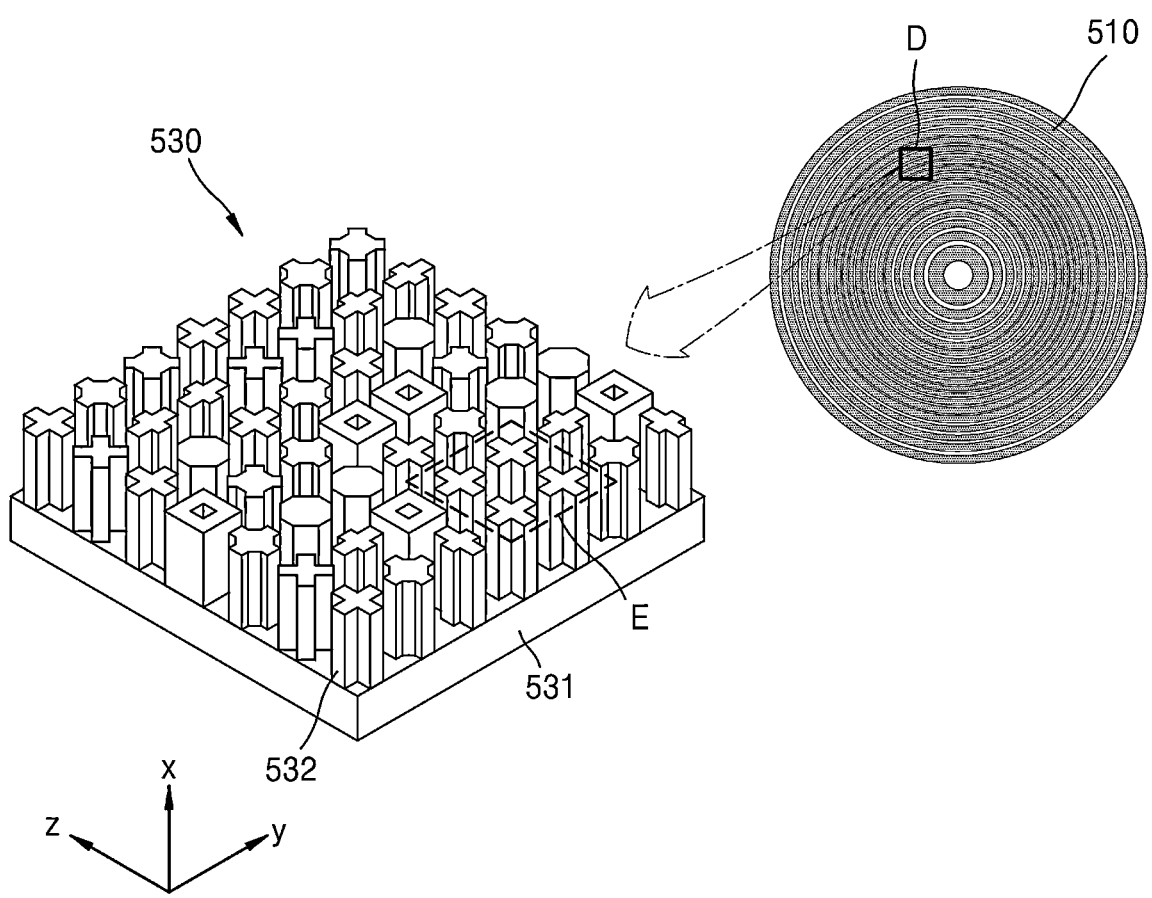
FIG. 5 is a diagram for describing a phase mask according to an embodiment of the disclosure.

FIG. 5 is a diagram for describing a phase mask according to an embodiment of the disclosure.

According to an embodiment of the disclosure, an electronic device may modulate a phase of light incident in a first direction x, by using the phase mask. However, the disclosure is not limited to, and as such, according to another embodiment, the electronic device may modulate a phase of light incident in a direction opposite to the first direction x, by using the phase mask.

Referring to FIG. 5, according to an embodiment of the disclosure, the phase mask may be a meta lens 510. The meta lens 510 may have, for example, a pattern in circles. The meta lens 510 may have a pattern in which a uniform form is regularly repeated. In other words, the meta lens 510 may have a concentric pattern in which circular patterns having different sizes of radii are repeated. For reference, the meta lens 510 may have a similar pattern as the diffraction optical element 410 of FIG. 4, and thus, differences from the diffraction optical element 410 of FIG. 4 will be described by enlarging a region D of the meta lens 510.

According to an embodiment of the disclosure, a meta lens 530 may include a substrate 531 and a plurality of nano structures 532.

The substrate 531 may extend in a second direction y crossing the first direction x, and a third direction z crossing the first direction x. The substrate 531 may be formed on a plane extending in the second direction y and the third direction z.

The plurality of nano structures 532 may be arranged on the substrate 531. The plurality of nano structures 532 may extend perpendicular to a top surface of the substrate 531. The plurality of nano structures 532 may extend in the first direction x. The plurality of nano structures 532 may be spaced apart from each other at certain intervals.

The plurality of nano structures 532 included in the meta lens 530 may guide light incident on an optical system to an arbitrary focus, according to an arrangement form thereof. Here, the "arrangement form" may denote at least one of a position-specific size distribution, a position-specific shape distribution, or a position-specific interval distribution of the nano structures 532, with respect to a size, a shape, and an arrangement interval of each of the nano structures 532, and a region where the meta lens 530 is positioned. A detailed arrangement form of the nano structures 532 included in the meta lens 530 may vary according to an optical performance required in the meta lens 530. For example, the arrangement form of the nano structures 532 may vary according to a wavelength band, a focal length, or the like of light to be focused through the meta lens 530.

Figure 6:
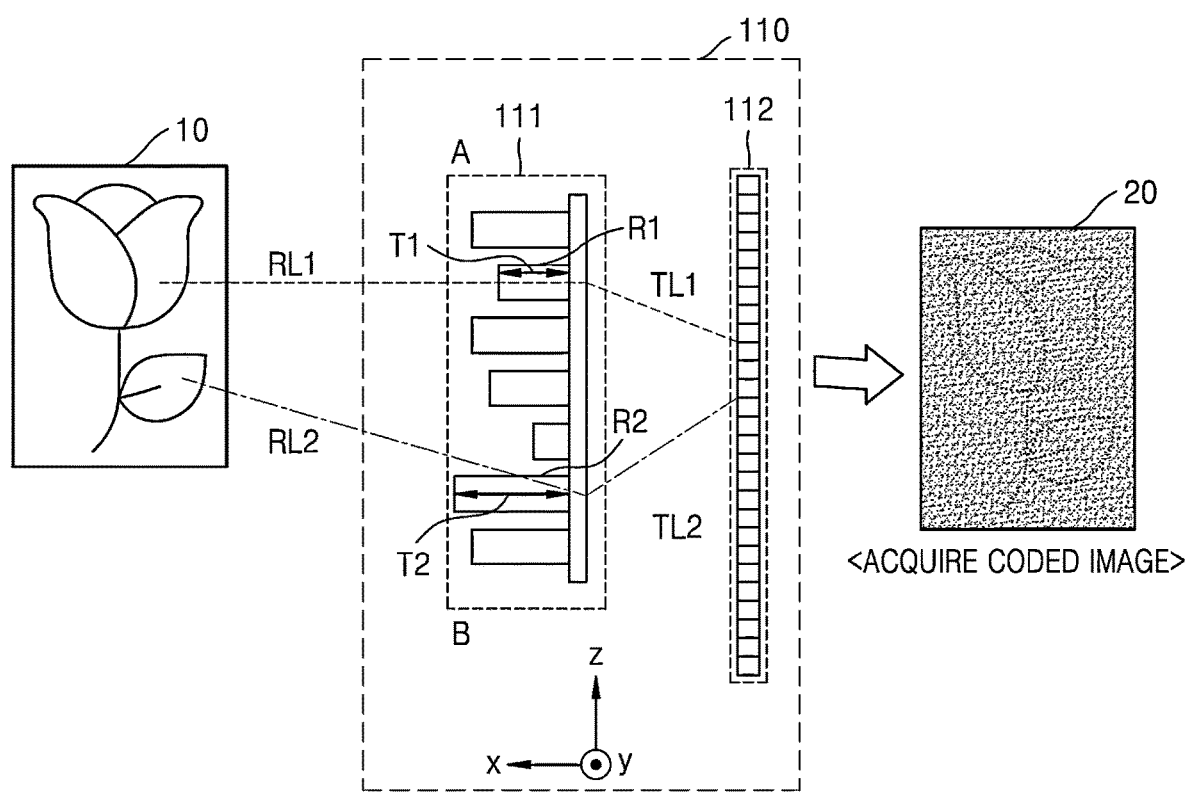
FIG. 6 is a conceptual diagram showing in detail an operation by which an electronic device acquires a coded image by using a phase mask, according to an embodiment of the disclosure.

FIG. 6 is a conceptual diagram showing in detail an operation by which an electronic device acquires a coded image by using a phase mask, according to an embodiment of the disclosure. For reference, FIG. 6 illustrates a cross-sectional view of the diffraction optical element 430 of FIG. 4 taken along a line A-B of FIG. 4 as an example of the phase mask according to an embodiment of the disclosure.

Referring to FIG. 6, according to an embodiment of the disclosure, the electronic device may acquire the coded image 20 in which a phase is modulated by receiving light that transmitted through the phase mask 111, through the image sensor 112. The electronic device may acquire the coded image 20 by acquiring a distribution of light transmitted through the phase mask 111.

The phase mask 111 through which the light is transmitted may include a first rod R1 having a first thickness T1 and a second rod R2 having a second thickness T2. The light transmitted through the phase mask 111 may be refracted differently according to a thickness of a region in which the light is transmitted through, and accordingly, the electronic device may acquire the coded image 20.

The light may be reflected from the object 10, be transmitted through the phase mask 111, and reach the image sensor 112.

The light may be divided into first light and second light. In this case, the first light may reach the object 10, i.e., a rose. The first light that reached the object 10 may be reflected from a surface of the object 10. The reflected first light may be first reflected light RL1. The first reflected light RL1 from the surface of the object 10 may be transmitted towards the phase mask 111.

The first reflected light RL1 may be refracted by the phase mask 111. The first reflected light RL1 may be refracted by the first rod R1 of the phase mask 111. The first rod R1 may be a pattern region of the phase mask 111, having the first thickness T1. The first reflected light RL1 may be refracted by being transmitted through the first rod R1 having the first thickness T1. The transmitted first reflected light RL1 may be first transmitted light TL1. The first thickness T1 may be relatively thin compared to the second thickness T2 described below. Accordingly, the first transmitted light TL1 may be refracted relatively less and reach the image sensor 112. The image sensor 112 may be configured to receive the first transmitted light TL1 that transmitted through the first rod R1.

The second light may reach the object 10. The second light that reached the object 10 may be reflected from the surface of the object 10. The reflected second light may be second reflected light RL2. The second reflected light RL2 from the surface of the object 10 may be transmitted towards the phase mask 111.

The second reflected light RL2 may be transmitted through the phase mask 111. The second reflected light RL2 may be transmitted through the second rod R2 of the phase mask 111. The second rod R2 may be a pattern region of the phase mask 111, having the second thickness T2. The second reflected light RL2 may be refracted by being transmitted through the second rod R2 having the second thickness T2. The transmitted second reflected light RL2 may be second transmitted light TL2. The second thickness T2 may be relatively thick compared to the first thickness T1. Accordingly, the second transmitted light TL2 may be refracted relatively more and reach the image sensor 112. The image sensor 112 may be configured to receive the second transmitted light TL2 that transmitted through the second rod R2.

The electronic device may acquire a distribution of light by receiving the light in which a phase is modulated by the phase mask 111 through the image sensor 112. The electronic device may acquire the coded image 20, based on the distribution of light. The image sensor 112 may acquire the coded image 20 by receiving the first transmitted light TL1 and the second transmitted light TL2. The first transmitted light TL1 and the second transmitted light TL2 are differently refracted by being respectively transmitted through the first rod R1 and the second rod R2 of the phase mask 111, and thus, the coded image 20 may include information about the object 10 that is unrecognizable with naked eyes.

According to an embodiment, the electronic device according to an embodiment of the disclosure may further include a light source outputting light. For example, the first reflected light RL1 may denote light reflected from a first point of the object 10 after being output from the light source, and the second reflected light RL2 may denote light reflected from a second point of the object 10 after being output from the light source.

In FIG. 6, the phase mask 111 has an irregular pattern including the first rod R1 having the first thickness T1 and the second rod R2 having the second thickness T2, based on the diffraction optical element 430 of FIG. 4, but the pattern of the phase mask 111 is only an example and the technical idea of the disclosure is not limited thereto. For example, the phase mask 111 may have a pattern of a cross-section in which the first rod R1 and the second rod R2 are repeatedly arranged.

An operation of acquiring the coded image 20 by receiving light transmitted through the phase mask 111 has been described with reference to FIG. 6, and a same principle may be applied to an operation of acquiring a coded image by receiving light transmitted through a diffraction optical element or a meta lens.

For example, the meta lens through which light is transmitted may be refracted differently according to an arrangement form of nano structures, and the electronic device may acquire the coded image 20 by receiving light transmitted through the meta lens.

Figure 7A:
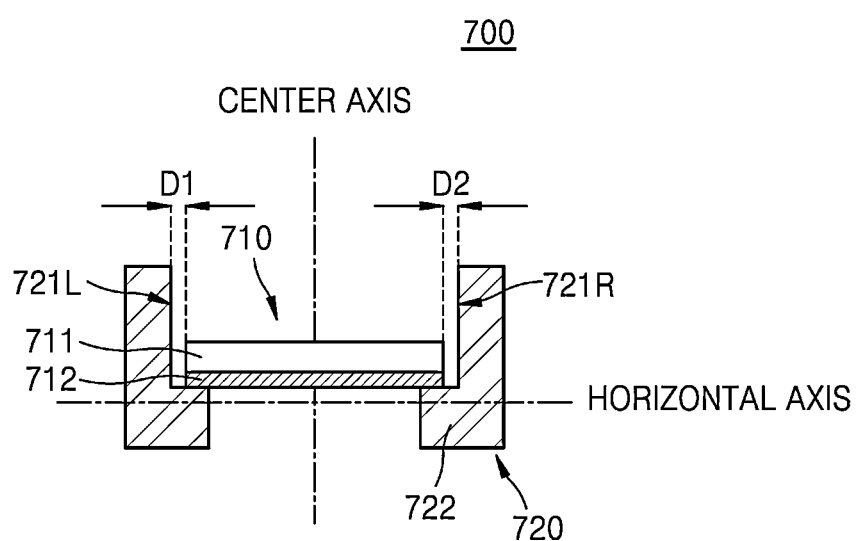
FIG. 7A is a diagram for describing a normal arrangement of a phase mask in an optical system, according to an embodiment of the disclosure.

FIG. 7A is a diagram for describing a normal arrangement of a phase mask in an optical system, according to an embodiment of the disclosure. A reference optical system 700 manufactured according to a design without an error is illustrated. The phase mask 710 illustrated in FIG. 7A may be a second phase mask not including noise.

Referring to FIG. 7A, the reference optical system 700 may include a housing 720 and the phase mask 710. The phase mask 710 may include a substrate 711 and a structure 712 arranged on the substrate 711. A phase of light transmitted through the phase mask 710 may be affected by the structure 712. For example, in an example case in which the phase mask 710 is a diffraction optical element, the structure 712 may be the plurality of nodes 432 described with reference to FIG. 4, and in an example case in which the phase mask 710 is a meta lens, the structure 712 may be the plurality of nano structures 532 described with reference to FIG. 5.

The housing 720 may be a feature configured to fix the phase mask 710 therein. The phase mask 710 may be provided between inner walls 721L and 721R of the housing 720 of the reference optical system 700. For reference, FIG. 7A illustrates a cross-sectional view of the reference optical system 700, and the housing 720 may be cylindrical and the inner walls 721L and 721R of the housing 720 may be a same configuration.

In the reference optical system 700, a center position of the phase mask 710 may be on a housing center axis. The housing center axis may be an axis connecting the center of the housing 720. The housing center axis may be an axis separated from the inner walls 721L and 721R of the housing 720 by a same distance. The housing center axis may be the same as an axis connecting the center of the phase mask 710. In other words, the phase mask 710 may be arranged at a correct position without being tilted in the housing 720.

In other words, in the reference optical system 700, a first distance D1 between the inner wall 721L at the left and a side wall of the phase mask 710 may be the same as a second distance D2 between the inner wall 721R at the right and the side wall of the phase mask 710. FIG. 7A illustrates a cross-sectional view of the reference optical system 700, and an interval between an inner wall of the housing 720 and a side wall of the phase mask 710 may be uniform.

The housing 720 may include a support 722. In the reference optical system 700, the phase mask 710 may be arranged on the support 722. Accordingly, in the reference optical system 700, a top surface of the substrate 711 may be parallel to a horizontal axis. In other words, the phase mask 710 may be accommodated in the housing 720 without being tilted in one direction.

According to an embodiment of the disclosure, light may be incident parallel to the housing center axis, and a phase of the incident light may be modulated by the phase mask 710. According to an embodiment, the light in which the phase is modulated may be received by an image sensor. An electronic device may acquire a coded image, based on the received light. According to an embodiment of the disclosure, the electronic device may acquire the coded image by receiving the light in which the phase is modulated by the phase mask 710, by the image sensor.

Figure 7B:
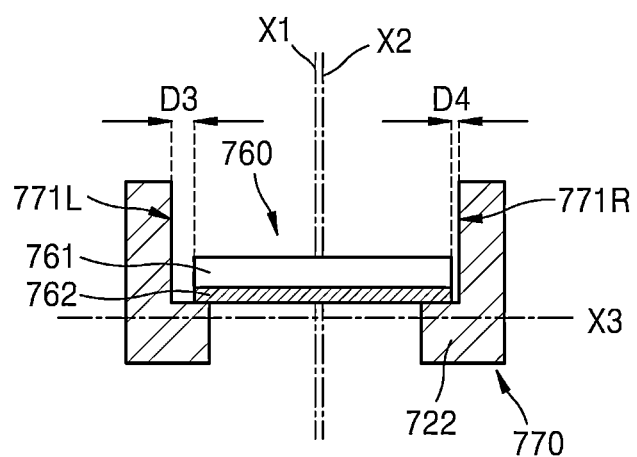
FIG. 7B is a diagram for describing an assembly error according to an abnormal arrangement of a phase mask in an optical system, according to an embodiment of the disclosure.

FIG. 7B is a diagram for describing an assembly error according to an abnormal arrangement of a phase mask in an optical system, according to an embodiment of the disclosure. For convenience of description, details that overlap those described with reference to FIG. 7A will be briefly described or omitted. For example, FIG. 7B illustrates the placement of the phase mask 760, and the substrate 761 and the structure 762 are the same as the substrate 711 and the structure 712 shown in FIG. 7A, and their associated descriptions are omitted. The phase mask 760 illustrated in FIG. 7B may be a first phase mask including noise.

Referring to FIG. 7B, an optical system 750 according to an embodiment of the disclosure may include an assembly error in a case in which the phase mask 760 is decentered.

According to an embodiment of the disclosure, the phase mask 760 may be abnormally arranged in a space between inner walls 771L and 771R of a housing 770. In the optical system 750 that has been abnormally assembled, a center position of the phase mask 760 may not be positioned on a housing center axis X1. In other words, the center of the phase mask 760 may be decentered from the housing center axis X1. A mask center axis X2 connecting the center of the phase mask 760 may not be identical to the housing center axis X1. In the optical system 750 that has been abnormally assembled, distances between the phase mask 760 and the inner walls 771L and 771R of the housing 770 may not be the same. For example, a third distance D3 and a fourth distance D4 may not be the same.

Figure 7C:
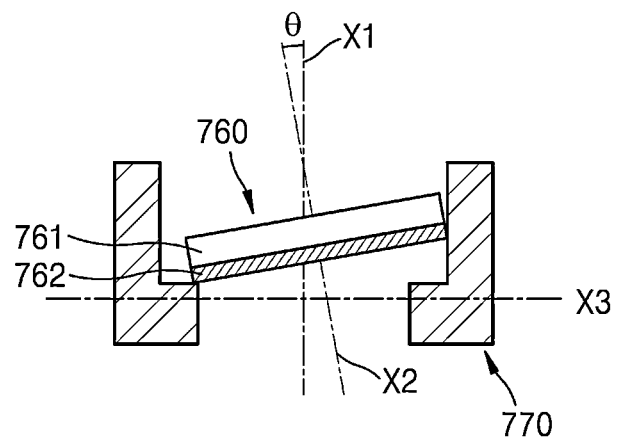
FIG. 7C is a diagram for describing an assembly error according to an abnormal arrangement of a phase mask in an optical system, according to an embodiment of the disclosure.

FIG. 7C is a diagram for describing an assembly error according to an abnormal arrangement of a phase mask in an optical system, according to an embodiment of the disclosure. For convenience of description, details that overlap those described with reference to FIGS. 7A and 7B will be briefly described or omitted. For example, FIG. 7C focuses on the placement of the phase mask 760, and the substrate 761 and the structure 762 are the same as the substrate 711 and the structure 712 shown in FIG. 7A, and their associated descriptions are omitted. The phase mask 760 illustrated in FIG. 7C may be a first phase mask including noise.

Referring to FIG. 7O, the optical system 750 according to an embodiment of the disclosure may include an assembly error in a case in which the phase mask 760 is tilted.

According to an embodiment of the disclosure, the phase mask 760 may be abnormally arranged in a space between inner walls of the housing 770. In the optical system 750 that has been abnormally assembled, the phase mask 760 may be tilted. The mask center axis X2 connecting the center of the phase mask 760 may not be parallel to the housing center axis X1. The mask center axis X2 may cross the housing center axis X1. The mask center axis X2 may be tilted by a certain angle θ, based on the housing center axis X1. Accordingly, a top surface of a substrate 761 may not be parallel to a horizontal axis X3. The top surface of the substrate 761 may cross the horizontal axis X3.

Figure 8A:
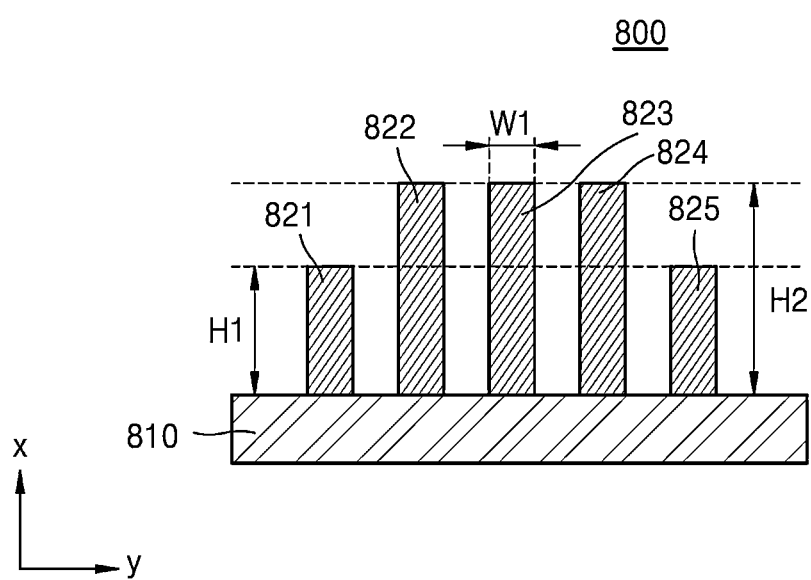
FIG. 8A is a diagram for describing a structure of a phase mask that is normally manufactured, according to an embodiment of the disclosure.

FIG. 8A is a diagram for describing a structure of a phase mask that is normally manufactured, according to an embodiment of the disclosure. A structure of a phase mask manufactured according to a design without an error is illustrated. A structure of a phase mask, which is a reference, will be described with reference to FIG. 8A. For convenience of description, details that overlap those described with reference to FIG. 4 will be briefly described or omitted. A diffraction optical element as a phase mask 800 illustrated in FIG. 8A may be a second phase mask not including noise.

Referring to FIG. 8A, the phase mask 800 according to an embodiment of the disclosure may be the diffraction optical element. The phase mask 800 may include a substrate 810 and a plurality of rods. The plurality of rods may include a first rod 821, a second rod 822, a third rod 823, a fourth rod 824 and a fifth rod 825. For convenience of description, the plurality of rods include five rods. However, the disclosure is not limited thereto, and as such, according to another embodiment, the number of rods may be different than five rods.

The substrate 810 may extend in a second direction y crossing a first direction x. FIG. 8A is illustrated in two dimensions, but the substrate 810 may be arranged in a plane extending in the second direction y and a third direction crossing the first direction x. The first to fifth rods 821 to 825 may be arranged on the substrate 810. The first to fifth rods 821 to 825 may extend in the first direction x.

According to an embodiment of the disclosure, the phase mask 800 that has been normally manufactured may include the first to fifth rods 821 to 825 having a same first width W1.

According to an embodiment of the disclosure, heights of the plurality of rods may not be the same. In the phase mask 800 that has been normally manufactured, the first rod 821 and the fifth rod 825 may have a first height H1. The first rod 821 and the fifth rod 825 may extend by the first height H1 in the first direction x. In the phase mask 800 that has been normally manufactured, the second to fourth rods 822 to 824 may have a second height H2. The second to fourth rods 822 to 824 may extend by the second height H2 in the first direction x. A pattern of the phase mask 800 may be formed based on height differences of the first to fifth rods 821 to 825.

However, for convenience of description, it has been described that the first rod 821 and the fifth rod 825 have the first height H1 and the second to fourth rods 822 to 824 have the second height H2 in the phase mask 800 that has been normally manufactured, but this is only an example and does not limit the technical idea of the disclosure. For example, in the phase mask 800 that has been normally manufactured, the first rod 821, the third rod 823, and the fifth rod 825 may have the first height H1, and the second rod 822 and the fourth rod 824 may have the second height H2. The pattern of the phase mask 800 according to a height of each rod does not limit the technical idea of the disclosure. A structure of the phase mask 800 may vary according to an optical performance required in the phase mask 800.

According to an embodiment of the disclosure, light may be incident perpendicular to the substrate 810, and a phase of the incident light may be modulated by the phase mask 800. For example, light may be incident on the phase mask 800 in the first direction x. As another example, light may be incident on the phase mask 800 in a direction opposite to the first direction x. According to an embodiment, light in which a phase is modulated may be received by an image sensor. An electronic device may acquire a coded image, based on the received light. According to an embodiment of the disclosure, the electronic device may acquire the coded image by receiving the light in which the phase is modulated by the phase mask, by the image sensor.

Figure 8B:
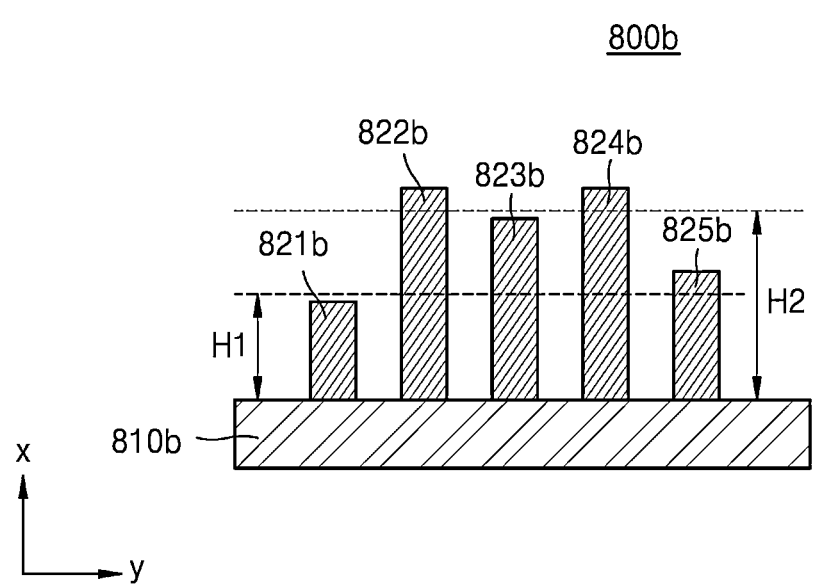
FIG. 8B is a diagram for describing a manufacture error according to a structure of a phase mask that is abnormally manufactured, according to an embodiment of the disclosure.

FIG. 8B is a diagram for describing a manufacture error according to a structure of a phase mask that is abnormally manufactured, according to an embodiment of the disclosure. For convenience of description, details that overlap those described with reference to FIG. 8A will be briefly described or omitted. A phase mask 800b illustrated in FIG. 8B may be a first phase mask including noise.

For convenience of description, the phase mask 800b of FIG. 8B, which is abnormally manufactured, will be described in comparison with the phase mask 800 of FIG. 8A, which is normally manufactured.

Referring to FIG. 8B, an optical system according to an embodiment of the disclosure may have a manufacture error related to a structure of the phase mask 800b. The manufacture error may include an error related to heights of a plurality of rods, (e.g., first to fifth rods 821b to 825b), occurred when the plurality of rods are formed.

According to an embodiment of the disclosure, the first to fifth rods 821b to 825b are not normally manufactured, and may have the error related to the heights. For example, a first rod that is normally manufactured has the first height H1, but the first rod 821b that is abnormally manufactured may be have a height less than the first height H1. A second rod that is normally manufactured has the second height H2, but the second rod 822b that is abnormally manufactured may have a height greater than the second height H2. A third rod that is normally manufactured has the second height H2, but the third rod 823b that is abnormally manufactured may have a height less than the second height H2. A fourth rod that is normally manufactured has the second height H2, but the fourth rod 824b that is abnormally manufactured may have a height greater than the second height H2. A fifth rod that is normally manufactured has the first height H1, but the fifth rod 825b that is abnormally manufactured may have a height greater than the first height H1.

A pattern of the phase mask 800b may be different from an intention of production due to the error related to the heights, occurred when the first to fifth rods 821b to 825b are manufactured. A phase of light that passed through the phase mask 800b may be additionally modulated due to the error related to the heights.

For example, a path of light that passed through the phase mask 800 of FIG. 8A, which is normally manufactured, may be different from a path of light that passed through the phase mask 800b that is abnormally manufactured, described with reference to FIG. 8B. A distribution of light that passed through the phase mask 800 of FIG. 8A, which is normally manufactured, may be different from a distribution of light that passed through the phase mask 800b that is abnormally manufactured, described with reference to FIG. 8B. According to an embodiment of the disclosure, even in a case in which an electronic device receives light reflected from a same object, a coded image acquired based on light that is transmitted through the phase mask 800 of FIG. 8A, which is normally manufactured, may be different from a coded image acquired based on light that is transmitted through the phase mask 800*b* that is abnormally manufactured, described with reference to FIG. 8B.

Figure 8C:
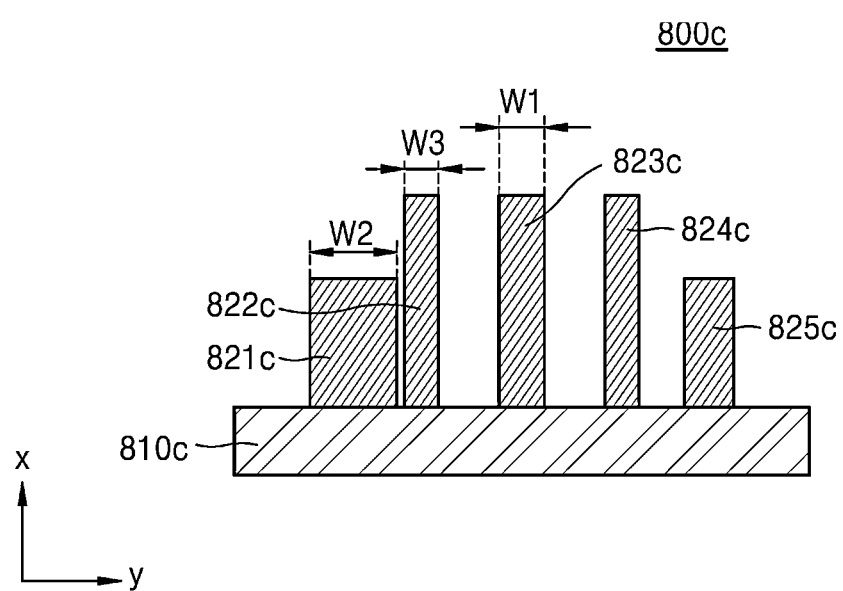
FIG. 8C is a diagram for describing a manufacture error according to a structure of a phase mask that is abnormally manufactured, according to an embodiment of the disclosure.

FIG. 8C is a diagram for describing a manufacture error according to a structure of a phase mask that is abnormally manufactured, according to an embodiment of the disclosure. For convenience of description, details that overlap those described with reference to FIG. 8A will be briefly described or omitted. A phase mask 800*c* illustrated in FIG. 8C may be a first phase mask including noise.

For convenience of description, the phase mask 800*c* of FIG. 8C, which is abnormally manufactured, will be described in comparison with the phase mask 800 of FIG. 8A, which is normally manufactured.

Referring to FIG. 8C, an optical system according to an embodiment of the disclosure may have a manufacture error related to a structure of the phase mask 800*c*. The manufacture error may include an error related to widths of a plurality of rods, (e.g., first to fifth rods 821*c* to 825*c*), occurred when the plurality of rods are formed.

According to an embodiment of the disclosure, the first to fifth rods 821*c* to 825*c* are not normally manufactured, and may have the error related to the widths. For example, a plurality of rods (the first to fifth rods 821 to 825 of FIG. 8A) that are normally manufactured may each have the first width W1. For convenience of description, the third rod 823*c* is illustrated as being normally manufactured to have the first width W1 in FIG. 8C.

In comparison, the first rod 821*c* that is abnormally manufactured may have a second width W2 greater than the first width W1. The second rod 822*c* that is abnormally manufactured may have a third width W3 less than the first width W1. Details about widths of the fourth and fifth rods 824*c* and 825*c* overlap those described by using the first rod 821*c* and the second rod 822*c*, and thus are not provided again.

A pattern of the phase mask 800*c* may be different from an intention of production due to the error related to the widths, occurred when the first to fifth rods 821*c* to 825*c* are manufactured. A phase of light that passed through the phase mask 800*c* may be additionally modulated due to the error related to the widths.

For example, a path of light that passed through the phase mask 800 of FIG. 8A, which is normally manufactured, may be different from a path of light that passed through the phase mask 800*c* that is abnormally manufactured, described with reference to FIG. 8C. A distribution of light that passed through the phase mask 800 of FIG. 8A, which is normally manufactured, may be different from a distribution of light that passed through the phase mask 800*c* that is abnormally manufactured, described with reference to FIG. 8C. According to an embodiment of the disclosure, even in a case in which an electronic device receives light reflected from a same object, a coded image acquired based on light that is transmitted through the phase mask 800 of FIG. 8A, which is normally manufactured, may be different from a coded image acquired based on light that is transmitted through the phase mask 800*c* that is abnormally manufactured, described with reference to FIG. 8C.

Figure 8D:
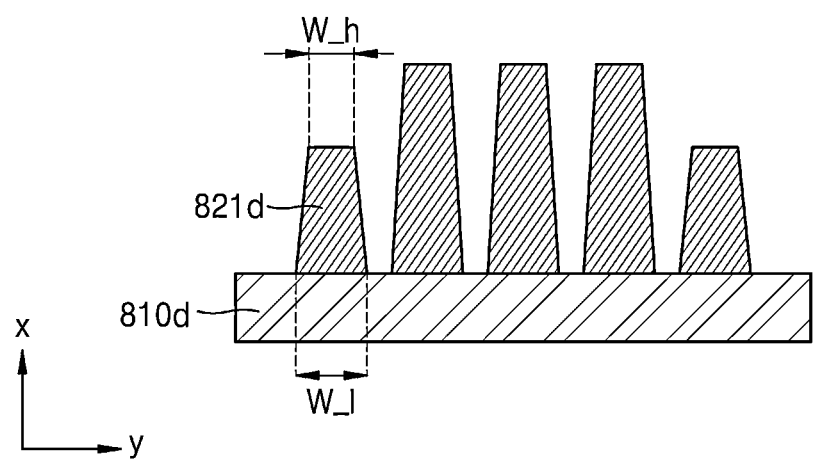
FIG. 8D is a diagram for describing a manufacture error according to a structure of a phase mask that is abnormally manufactured, according to an embodiment of the disclosure.

FIG. 8D is a diagram for describing a manufacture error according to a structure of a phase mask that is abnormally manufactured, according to an embodiment of the disclosure. For convenience of description, details that overlap those described with reference to FIG. 8A will be briefly described or omitted. A phase mask 800*d* illustrated in FIG. 8D may be a first phase mask including noise.

Referring to FIG. 8D, an optical system according to an embodiment of the disclosure may have a manufacture error related to a structure of the phase mask 800*d*. The manufacture error may include an error related to widths of a plurality of rods, occurred when the plurality of rods are formed.

According to an embodiment of the disclosure, the plurality of rods may have a tapered shape. For example, among the plurality of rods, a first rod 821*d* may have an upper width W_h at an upper portion and a lower width W_l at a lower portion. The upper width W_h may be less than the lower width W_l. In other words, a width of the first rod 821*d* may decrease in the first direction x.

Details about a second rod to a fifth rod are similar to those described in relation to the first rod 821*d*, and as such, separate description of the second rod to the fifth rod are omitted.

A pattern of the phase mask 800*d* may be different from an intention of production due to an error related to tapering occurred when the first rod 821*d* and the second to fifth rods are manufactured. A phase of light that passed through the phase mask 800*d* may be additionally modulated due to the error related to the widths, i.e., tapering.

For example, a path of light that passed through the phase mask 800 of FIG. 8A, which is normally manufactured, may be different from a path of light that passed through the phase mask 800*d* that is abnormally manufactured, described with reference to FIG. 8D. A distribution of light that passed through the phase mask 800 of FIG. 8A, which is normally manufactured, may be different from a distribution of light that passed through the phase mask 800*d* that is abnormally manufactured, described with reference to FIG. 8D. According to an embodiment of the disclosure, even in a case in which an electronic device receives light reflected from a same object, a coded image acquired based on light that is transmitted through the phase mask 800 of FIG. 8A, which is normally manufactured, may be different from a coded image acquired based on light that is transmitted through the phase mask 800*d* that is abnormally manufactured, described with reference to FIG. 8D.

Figure 8E:
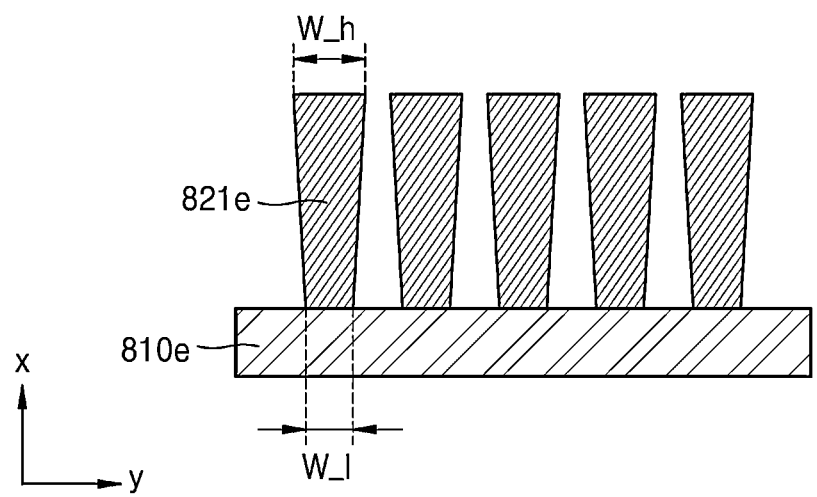
FIG. 8E is a diagram for describing a manufacture error according to a structure of a phase mask that is abnormally manufactured, according to an embodiment of the disclosure.

FIG. 8E is a diagram for describing a manufacture error according to a structure of a phase mask that is abnormally manufactured, according to an embodiment of the disclosure. For convenience of description, details that overlap those described with reference to FIG. 8A will be briefly described or omitted. A phase mask 800*e* illustrated in FIG. 8E may be a first phase mask including noise.

Referring to FIG. 8E, an optical system according to an embodiment of the disclosure may have a manufacture error related to a structure of the phase mask 800*e*. The manufacture error may include an error related to widths of a plurality of rods, occurred when the plurality of rods are formed.

According to an embodiment of the disclosure, among the plurality of rods, a first rod 821*e* may have the upper width W_h at an upper portion and the lower width W_l at a lower portion. The upper width W_h may be greater than the lower width W_l. In other words, a width of the first rod 821*e* may increase in the first direction x. Details about a second rod to a fifth rod overlap those described by using the first rod 821*e*, and thus are not provided again.

A pattern of the phase mask 800e may be different from an intention of production due to the error related to the widths occurred when the first rod 821e and the second to fifth rods are manufactured. A phase of light that passed through the phase mask 800e may be additionally modulated due to the error related to the widths.

For example, a path of light that passed through the phase mask 800 of FIG. 8A, which is normally manufactured, may be different from a path of light that passed through the phase mask 800e that is abnormally manufactured, described with reference to FIG. 8E. A distribution of light that passed through the phase mask 800 of FIG. 8A, which is normally manufactured, may be different from a distribution of light that passed through the phase mask 800e that is abnormally manufactured, described with reference to FIG. 8E. According to an embodiment of the disclosure, even in a case in which an electronic device receives light reflected from a same object, a coded image acquired based on light that is transmitted through the phase mask 800 of FIG. 8A, which is normally manufactured, may be different from a coded image acquired based on light that is transmitted through the phase mask 800e that is abnormally manufactured, described with reference to FIG. 8E.

Figure 9A:
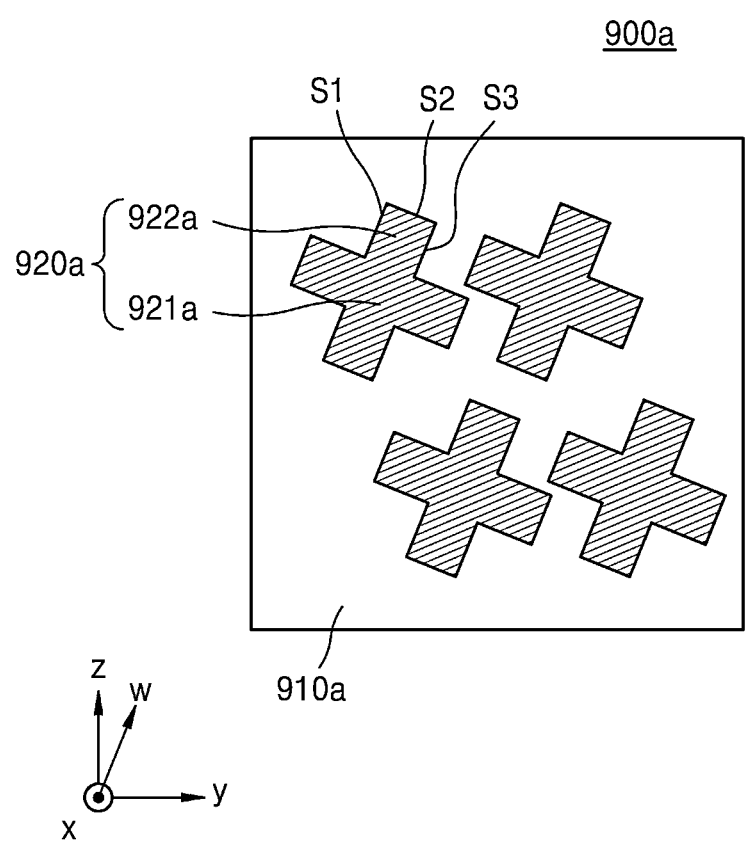
FIG. 9A is a diagram for describing a structure of a meta lens that is normally manufactured, according to an embodiment of the disclosure.

FIG. 9A is a diagram for describing a structure of a meta lens that is normally manufactured, according to an embodiment of the disclosure. A structure of a meta lens manufactured according to a design without an error is illustrated. A structure of a meta lens, which is a reference, will be described with reference to FIG. 9A. For reference, FIG. 9A is a plan view for describing a region E of FIG. 5 in detail. Also, FIG. 9A is a cross-sectional view cut in a cross section perpendicular to the first direction x.

For convenience of description, details that are similar to those described with reference to FIG. 5 will be briefly described or omitted.

A meta lens 900a as a phase mask, illustrated in FIG. 9A, may be a second phase mask not including noise.

Referring to FIG. 9A, the meta lens 900a according to an embodiment of the disclosure may include a substrate 910a and a plurality of nano structures. The plurality of nano structures may include a first nano structure 920a to a fourth nano structure, and for convenience of description, the first nano structure 920a will mainly described.

The substrate 910a may extend in the second direction y crossing the first direction x. The substrate 910a may extend in the third direction z crossing the first direction x. The substrate 910a may be arranged on a plane extending in the second direction y and the third direction z. The plurality of nano structures may be arranged on the substrate 910a. The plurality of nano structures may extend in the first direction x.

According to an embodiment of the disclosure, the first nano structure 920a may include a center portion 921a and a wing portion 922a. For example, the first nano structure 920a may have a shape including four wing portions 922a on side surfaces of the center portion 921a.

According to an embodiment of the disclosure, the wing portion 922a may have an angled shape. For example, a first side surface S1 of the wing portion 922a may be parallel to a plane extending in the first direction x and a fourth direction w. The fourth direction w may be perpendicular to the first direction x and cross the second direction y and the third direction z. A second side surface S2 of the wing portion 922a may be parallel to the first direction x and perpendicular to the fourth direction w. A third side surface S3 of the wing portion 922a may be parallel to the plane extending in the first direction x and the fourth direction w.

In other words, the wing portion 922a has an angled shape and extend in the first direction x.

However, the first nano structure 920a shown in FIG. 9A is described as a nano structure that is a design reference, and a shape of the first nano structure 920a that is a design reference may vary according to an optical performance required in the meta lens 900a.

According to an embodiment of the disclosure, the plurality of nano structures may be arranged on the substrate 910a by being spaced apart from each other. A detailed arrangement form of the nano structures included in the meta lens 900a may vary according to the optical performance required in the meta lens 900a.

Figure 9B:
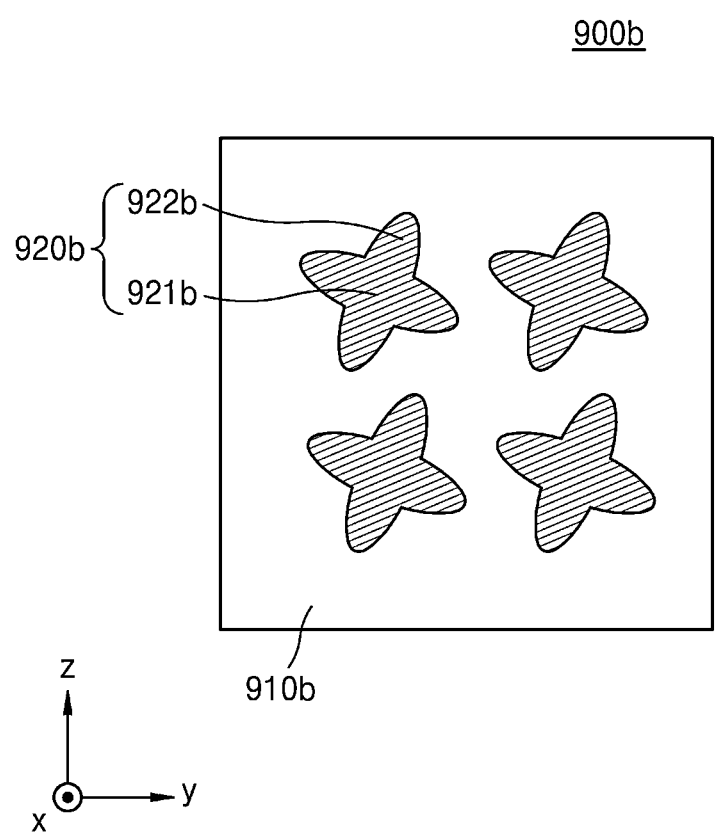
FIG. 9B is a diagram for describing a manufacture error occurred according to a nano structure, in a meta lens according to an embodiment of the disclosure.

FIG. 9B is a diagram for describing a manufacture error occurred according to a nano structure, in a meta lens according to an embodiment of the disclosure. For convenience of description, details that overlap those described with reference to FIG. 9A will be briefly described or omitted.

For convenience of description, a meta lens 900b of FIG. 9B, which is abnormally manufactured, will be described in comparison with the meta lens 900a of FIG. 9A, which is normally manufactured.

The meta lens 900b as a phase mask, illustrated in FIG. 9B, may be a first phase mask including noise.

Referring to FIG. 9B, an optical system according to an embodiment of the disclosure may have a manufacture error related to a structure of the meta lens 900b. The manufacture error may include an error related to shapes of a plurality of nano structures 920b, occurred when the plurality of nano structures 920b are formed.

According to an embodiment of the disclosure, the plurality of nano structures 920b are not normally manufactured and may have the error related to the shapes. In a nano structure that is normally manufactured, a wing portion (the wing portion 922a of FIG. 9A) may have an angled shape. In comparison, a wing portion 922b may have a streamlined shape. The wing portion 922b may have a shape in which a width is decreased away from a center portion 921b.

A pattern of the meta lens 900b may be different from an intention of production due to the error related to the shape, which occurred when the plurality of nano structures are manufactured. A phase of light that passed through the meta lens 900b may be additionally modulated due to the error related to the shape.

For example, a path of light that passed through the meta lens 900a of FIG. 9A, which is normally manufactured, may be different from a path of light that passed through the meta lens 900b that is abnormally manufactured, described with reference to FIG. 9B. A distribution of light that passed through the meta lens 900a of FIG. 9A, which is normally manufactured, may be different from a distribution of light that passed through the meta lens 900b that is abnormally manufactured, described with reference to FIG. 9B. According to an embodiment of the disclosure, even in a case in which an electronic device receives light reflected from a same object, a coded image acquired based on light that is transmitted through the meta lens 900a of FIG. 9A, which is normally manufactured, may be different from a coded image acquired based on light that is transmitted through the meta lens 900b that is abnormally manufactured, described with reference to FIG. 9B.

Figure 10:
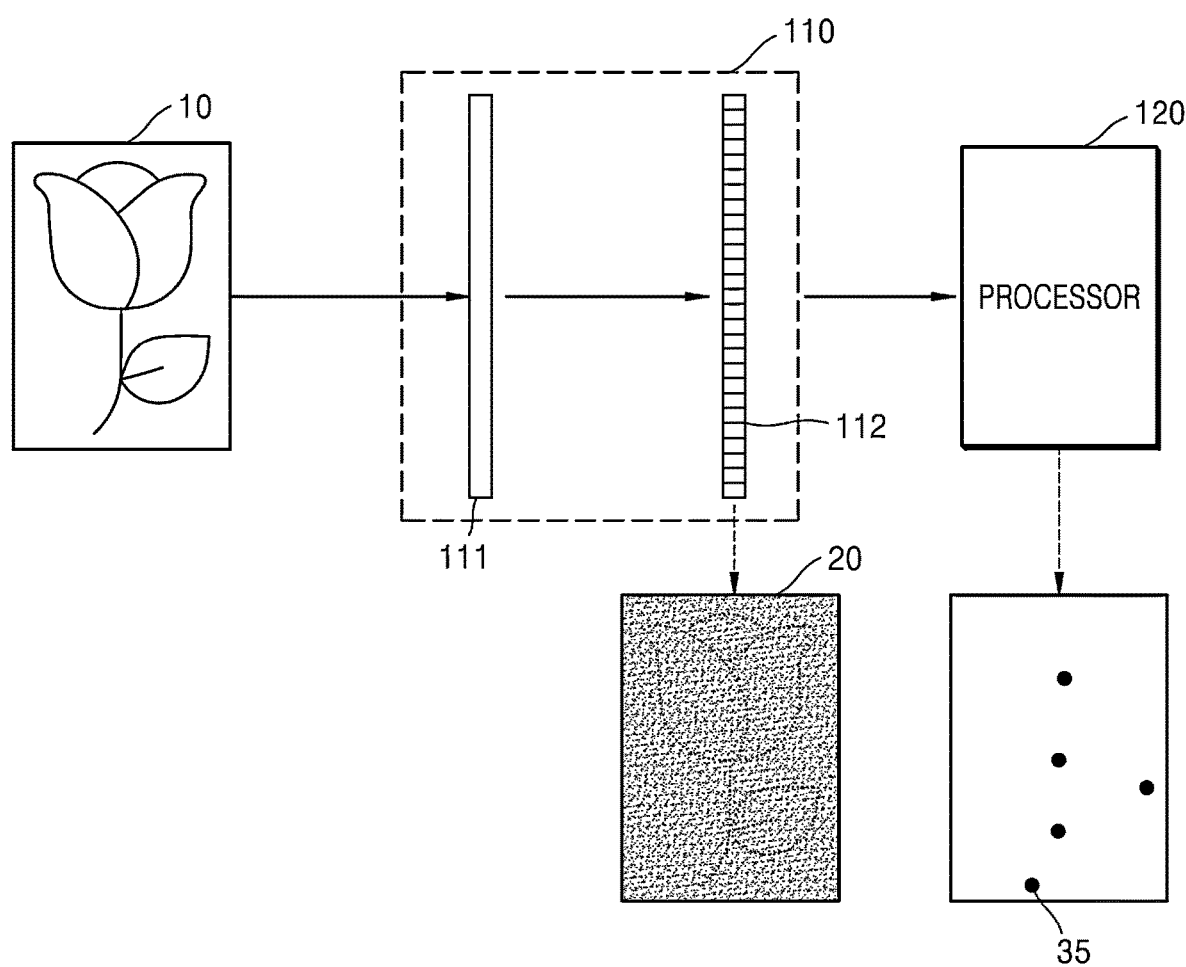
FIG. 10 is a conceptual diagram showing an operation by which an electronic device extracts a feature point by using a phase mask, according to an embodiment of the disclosure.

FIG. 10 is a conceptual diagram showing an operation by which an electronic device extracts a feature point by using a phase mask, according to an embodiment of the disclosure.

For convenience of description, details that overlap those described with reference to FIG. 1 will be briefly described or omitted.

According to an embodiment, a feature point may denote a point indicating an important feature or a point of interest in an image. For example, a corner where two or more edges detected based on a change in a pixel value cross each other, or a point where a pixel value in the image is the maximum or minimum may be the feature point.

Referring to FIG. 10, according to an embodiment of the disclosure, light may be incident on the phase mask 111. The incident light may be light reflected from the object 10 located in front of the phase mask 111. A phase of the transmitted light may be modulated by the phase mask 111.

According to an embodiment of the disclosure, the electronic device may acquire the coded image 20 by receiving light transmitted through the phase mask 111, by using the image sensor 112. The electronic device may acquire the coded image 20 corresponding to the object 10, based on distribution of the light transmitted through the phase mask 111 including noise.

According to an embodiment of the disclosure, the phase mask 111 may be configured as one of the first phase mask including noise and the second phase mask not including the noise. The electronic device may acquire a first coded image by receiving light transmitted through the first phase mask, by using the image sensor 112. The electronic device may acquire a second coded image by receiving light transmitted through the second phase mask, by using the image sensor 112. The electronic device may acquire the first coded image or the second coded image corresponding to the object 10, based on a distribution the light transmitted through the first phase mask or the second phase mask.

According to an embodiment of the disclosure, the electronic device may acquire a feature point 35 from the coded image 20. The electronic device may acquire the feature point 35 by inputting the acquired coded image 20 into an artificial intelligence model. The artificial intelligence model may be a model trained to extract a feature point. According to an embodiment of the disclosure, the artificial intelligence model may be a model trained to extract the feature point 35 from coded image 20 when transmitted through the phase mask 111. For example, the feature point 35 is extracted taking into account noise generated according to a process related to the phase mask 111.

According to an embodiment of the disclosure, the electronic device may acquire the feature point 35 by inputting the first coded image or the second coded image into the artificial intelligence model.

An error may occur during an assembly process of a phase mask in an optical system or an error may occur during a manufacture process of the phase mask, according to a process related to the phase mask. The electronic device according to an embodiment of the disclosure may acquire the same feature point 35 from the coded image 20 encoded according to various types of noise, by using an artificial intelligence model trained based on noise that is an error that occurred according to a process of a phase mask. Thus, the electronic device according to an embodiment of the disclosure may consistently extract the feature point 35 regardless of a process error related to the phase mask.

According to an embodiment of the disclosure, the electronic device may consistently extract the feature point 35, based on light transmitted through the second phase mask not including arbitrary noise generated according to a process of a phase mask, by using the trained artificial intelligence model. The electronic device may acquire the feature point 35 from the coded image acquired by being transmitted through the second phase mask not including noise, by using the trained artificial intelligence model.

Figure 11:
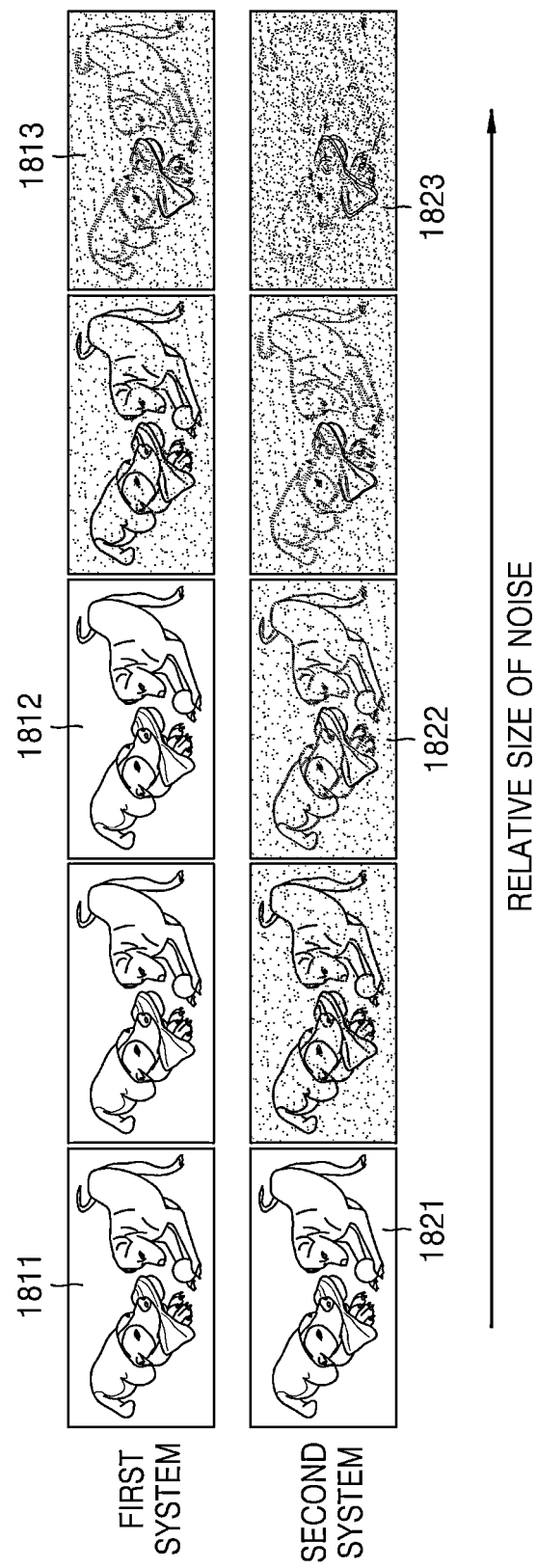
FIG. 11 is a diagram for describing an effect of an electronic device according to an embodiment of the disclosure.

FIG. 11 is a diagram for describing an effect of an electronic device according to an embodiment of the disclosure.

Referring to FIG. 11, an image reconstructed by a first system and an image reconstructed by a second system are compared with each other.

The first system may be a system in which an electronic device according to an embodiment of the disclosure reconstructs an image, by taking into account noise. For example, the first system may be a system for reconstructing an image by using an artificial intelligence model trained to reconstruct a coded image acquired based on light transmitted through a phase mask, by taking into account noise related to the phase mask.

On the other hand, the second system may be a system for reconstructing an image without considering noise. The second system may be a system for reconstructing a coded image acquired based on light transmitted through a phase mask.

According to an embodiment of the disclosure, quality of a reconstructed image may be low in a case in which a relative size of noise that is an error that occurred according to a process related to a phase mask is large. The first system may acquire a reconstructed image of low quality in a case in which a relative size of noise is large. The second system may acquire a reconstructed image of low quality in a case in which a relative size of noise is large.

According to an embodiment of the disclosure, the first system may acquire a reconstructed image of high quality in a case in which a relative size of noise is small. A first image 1811 may be an image reconstructed with high quality. The first system may acquire a reconstructed image of high quality even in a case in which a relative size of noise is medium. A second image 1812 may be an image reconstructed with high quality. However, the quality of the second image 1812 may be less than the quality of the first image 1811. In other words, in a case in which a relative size of noise is medium or less, the first system may consistently acquire a reconstructed image of high quality from a coded image.

The first system may acquire a reconstructed image of low quality in a case in which a relative size of noise is large. A third image 1813 may be an image reconstructed with low quality. The quality of the third image 1813 may be less than the quality of the second image 1812. In other words, in a case in which a relative size of noise is more than medium, the first system may be unable to acquire a reconstructed image of high quality from a coded image. According to an embodiment, a limit on a level of noise may be set for the first system to reconstruct an image with high quality. For example, the limit may be noise of a medium size.

However, the disclosure is not limited to setting a limit to a level of noise for acquiring a reconstructed image of high quality. For example, the limit to noise may vary according to a direction of training an artificial intelligence model trained to reconstruct a coded image acquired based on light transmitted through a phase mask including noise. In detail, the artificial intelligence model may be trained to consistently reconstruct an image for noise of a wide range or trained to reconstruct a precise image for noise of a narrow range, according to an intention of a user.

In comparison, the second system may acquire a reconstructed image of high quality in a case in which a relative size of noise is small. A fourth image 1821 may be an image reconstructed with high quality. The second system may be a system for acquiring a reconstructed image of high quality from a coded image in a case in which noise is insignificant.

However, the second system may acquire a reconstructed image of low quality in a case in which a relative size of noise is medium. A fifth image 1822 may be an image reconstructed with low quality. However, the quality of the fifth image 1822 may be less than the quality of the fourth image 1821. The second system may acquire a reconstructed image of low quality in a case in which a relative size of noise is large. A sixth image 1823 may be an image reconstructed with low quality. The quality of the sixth image 1823 may be less than the quality of the fifth image 1822. The second system may be a system that is difficult to consistently acquire a reconstructed image of high quality from a coded image in a case in which there is noise.

Figure 12:
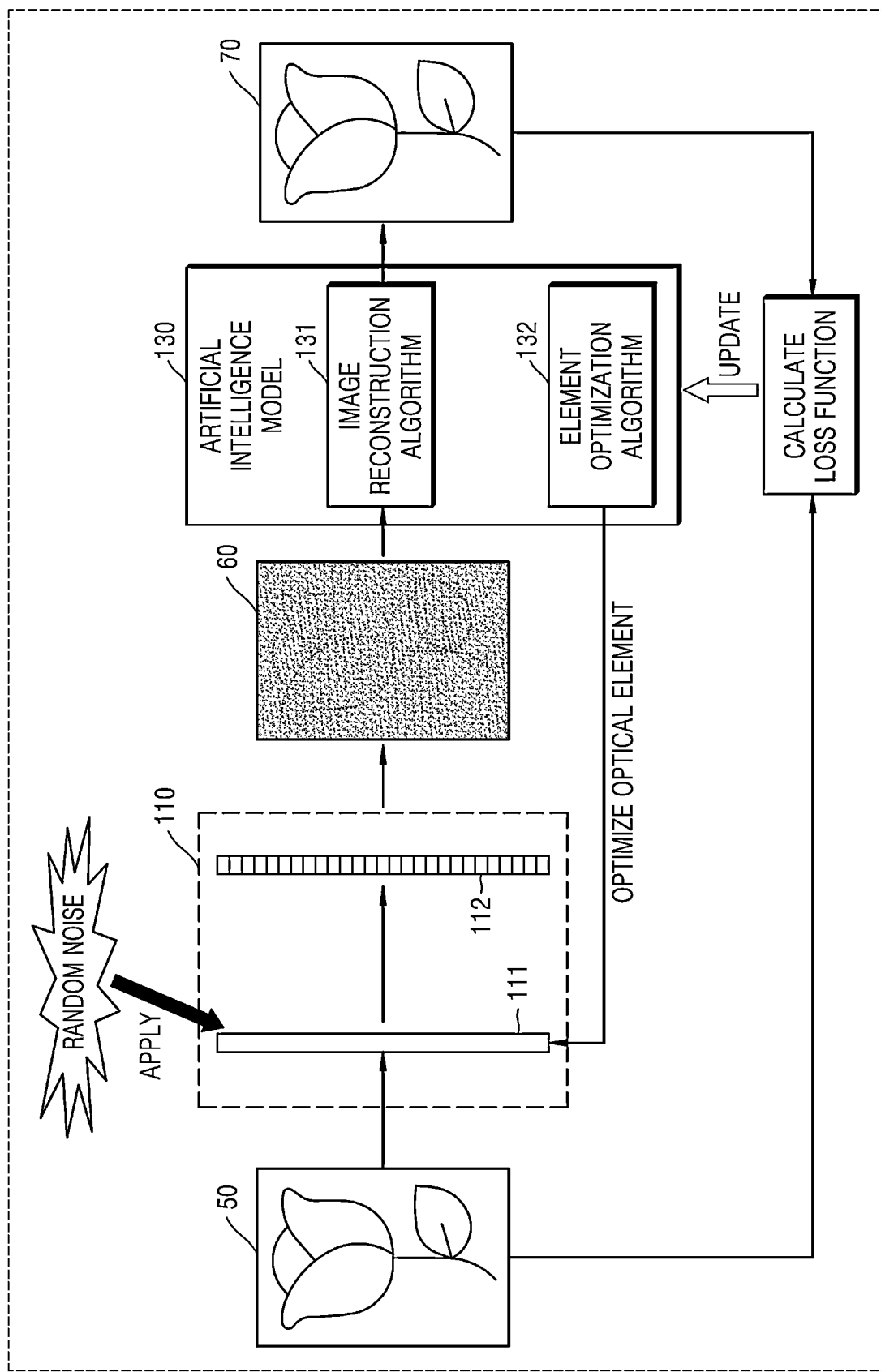
FIG. 12 is a conceptual diagram for describing an artificial intelligence model for reconstructing an image, based on a phase mask to which noise is applied, and learning based on the reconstructed image, according to an embodiment of the disclosure.

FIG. 12 is a conceptual diagram for describing an artificial intelligence model for reconstructing an image, based on a phase mask to which noise is applied, and learning based on the reconstructed image, according to an embodiment of the disclosure. For convenience of description, details that overlap those described with reference to FIGS. 1 and 2 will be briefly described or omitted.

Referring to FIG. 12, according to an embodiment of the disclosure, an electronic device includes an artificial intelligence model 130. For example, at least one processor of the electronic apparatus may train the artificial intelligence model 130 by performing various operations. For example, the artificial intelligence model 130 may be trained by acquiring a training coded image 60 from an input image 50 and acquire a training reconstructed image 70 by receiving the training coded image 60. The artificial intelligence model 130 may be trained by optimizing a design of the phase mask 111 through an element optimization algorithm 132 and update a parameter of the artificial intelligence model 130 to reconstruct an image through an image reconstruction algorithm 131, based on the training reconstructed image 70.

The artificial intelligence model 130 may be trained by acquiring the input image 50. For example, the input image 50 may be image data acquirable from a server. The input image 50 may include a certain object. In FIG. 1, the object is illustrated as a rose, but this is only an example and the disclosure is not limited thereto. For example, the object may be any object to be recognized by the electronic device, such as an eye, a laptop computer, a mobile phone, a cup of coffee, or the like.

As another example, the input image 50 may be a scene of an object located in front of the electronic device. The artificial intelligence model 130 may be trained by acquiring the scene including the object located in front of the electronic device, as the input image 50. However, the disclosure is not limited to a type of the object.

According to an embodiment of the disclosure, an operation performed through the phase mask 111 and the image sensor 112 may be an operation simulated by the artificial intelligence model 130. For example, the artificial intelligence model 130 may be trained by simulating a process in which light reflected from the object is transmitted through the phase mask 111 and forms an image through the image sensor 112. The artificial intelligence model 130 converts the light received by the image sensor 112 through the simulation into an electric signal to acquire the training coded image 60. The optical system 110 may be a virtual configuration required during a process by which the artificial intelligence model 130 simulates a distribution of light transmitted through the phase mask 111.

According to an embodiment of the disclosure, the artificial intelligence model 130 may be trained by acquiring the training coded image 60 corresponding to the input image 50 by simulating the distribution of light transmitted through the phase mask 111 to which random noise is applied.

The random noise may denote arbitrary (random) noise applicable to the phase mask 111. The random noise may include noise related to an assembly error that occurred according to misarrangement of the phase mask 111, and noise related to a manufacture error that occurred according to a structural defect of the phase mask 111. The artificial intelligence model 130 may realize the virtual phase mask 111 including random noise that is arbitrary noise, and acquire the distribution of light transmitted through the phase mask 111 realized through the simulation. The artificial intelligence model 130 may be trained by acquiring the training coded image 60, based on the simulated distribution of light. Details about the random noise overlap those about the noise described with reference to FIG. 1, and thus will be briefly provided.

For example, the artificial intelligence model 130 may calculate the distribution of light acquired through the phase mask 111 from a certain light source. The artificial intelligence model 130 may be trained by acquiring a point spread function for the light transmitted through the phase mask 111. The artificial intelligence model 130 may be trained by acquiring the training coded image 60 by performing a convolution operation on the input image 50 and the point spread function. The acquired training coded image 60 may correspond to the input image 50.

The artificial intelligence model 130 may be trained by acquiring a plurality of the training coded images 60 corresponding to one input image 50, based on random noise. The plurality of training coded images 60 correspond to one input image 50, but may vary depending on a size of the random noise of the phase mask 111 through which the light transmitted.

According to an embodiment of the disclosure, the artificial intelligence model 130 may be trained by acquiring the training reconstructed image 70, based on the training coded image 60. The artificial intelligence model 130 may be trained by acquiring the training reconstructed image 70 by being input with the training coded image 60. For example, the artificial intelligence model 130 may be trained by acquiring the training reconstructed image 70 from the training coded image 60 through an image reconstruction algorithm 131.

According to an embodiment of the disclosure, the artificial intelligence model 130 may calculate a loss function related to a difference between the training reconstructed image 70 and the input image 50. The artificial intelligence model 130 may be trained to minimize the loss function. The artificial intelligence model 130 may be trained to reconstruct an image closely to the input image 50 by calculating the loss function.

According to an embodiment of the disclosure, the artificial intelligence model 130 may optimize the phase mask 111 and update a parameter of the artificial intelligence model 130 by minimizing the loss function. The artificial intelligence model 130 may update the parameter such that a design of the phase mask 111 is optimized and an image is reconstructed closely to the input image 50.

According to an embodiment of the disclosure, the design of the phase mask 111 may be optimized to be advantageous for acquiring the training reconstructed image 70 from the training coded image 60, through an element optimization algorithm 132. For example, a device design variable for the design of the phase mask 111 may be set, and the electronic device may update the device design variable such that the training reconstructed image 70 is acquired closely to the input image 50 through training of minimizing the loss function. For example, the element design variable may include information about a location and angle of the phase mask 111 in the optical system 110, and information about a design of an element, such as a height and arrangement of a configuration in the phase mask 111.

According to an embodiment of the disclosure, the artificial intelligence model 130 may update the parameter of the artificial intelligence model 130 by being trained to minimize the loss function. For example, the artificial intelligence model 130 may update the parameter of the image reconstruction algorithm 131. The parameter of the artificial intelligence model 130 may be updated such that the difference between the training reconstructed image 70 and the input image 50 is minimized. Accordingly, the artificial intelligence model 130 may update the parameter of the artificial intelligence model 130 such that the training reconstructed image 70 close to the input image 50 is acquired.

Figure 13:
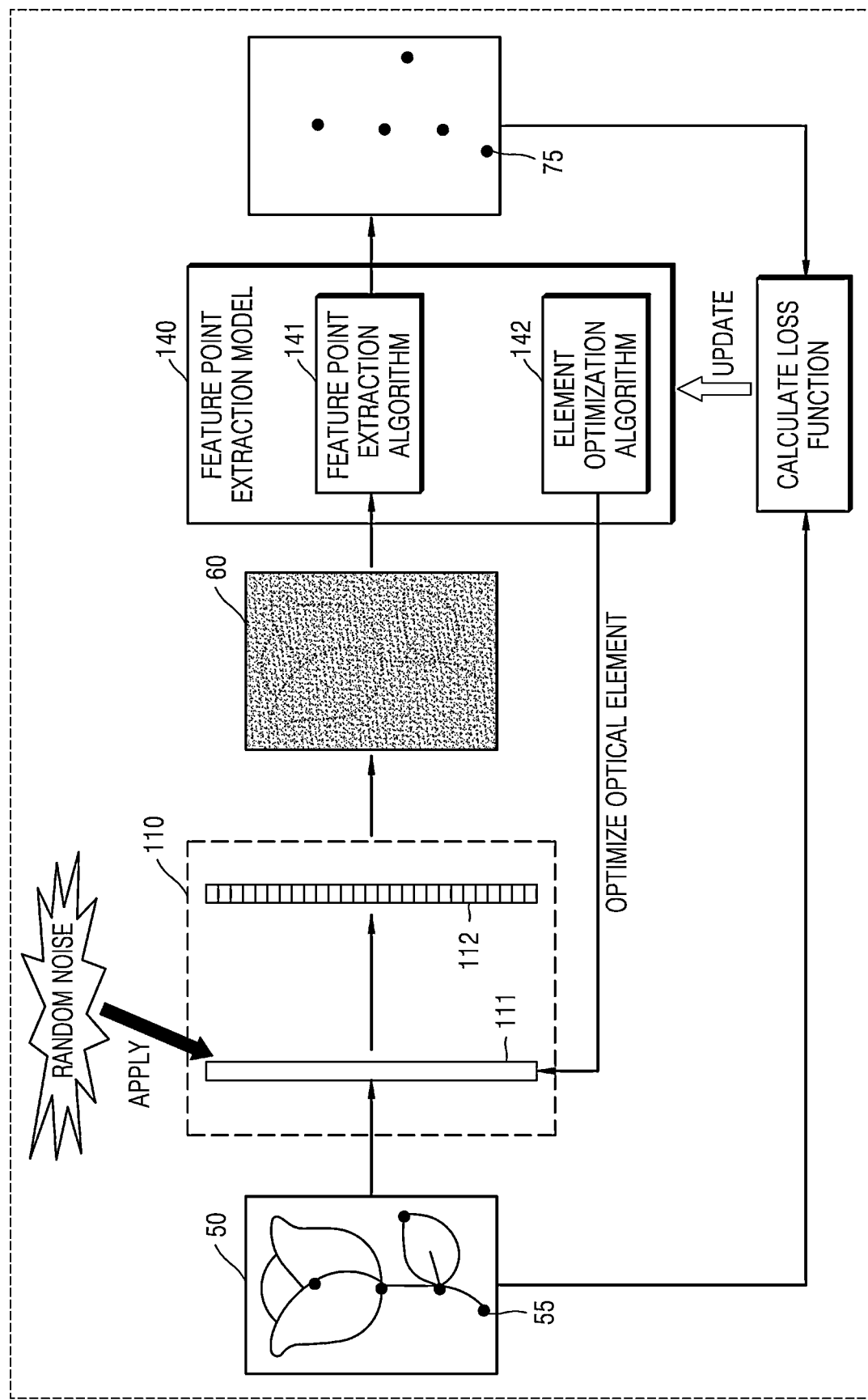
FIG. 13 is a conceptual diagram for describing an artificial intelligence model for extracting a feature point, based on a phase mask to which noise is applied, and learning based on the extracted feature point, according to an embodiment of the disclosure.

FIG. 13 is a conceptual diagram for describing an artificial intelligence model for extracting a feature point, based on a phase mask to which noise is applied, and learning based on the extracted feature point, according to an embodiment of the disclosure. For convenience of description, details that overlap those described with reference to FIGS. 1, 2, and 12 will be briefly described or omitted.

Referring to FIG. 13, according to an embodiment of the disclosure, an electronic device includes a feature point extraction model 140. The feature point extraction model 140 may be trained by acquiring the training coded image 60 from the input image 50 and extract a training feature point 75 by receiving the training coded image 60. The feature point extraction model 140 may optimize a design of the phase mask 111 through an element optimization algorithm 142 and update a parameter of the feature point extraction model 140 to extract a feature point through a feature point extraction algorithm 141, based on the training reconstructed image 70.

According to an embodiment of the disclosure, the feature point extraction model 140 may be trained by acquiring the training coded image 60 corresponding to the input image 50 by simulating a distribution of light transmitted through the phase mask 111 to which random noise is applied.

According to an embodiment of the disclosure, the feature point extraction model 140 may be trained by acquiring the training feature point 75, based on the training coded image 60. The feature point extraction model 140 may be trained by acquiring the training feature point 75 by receiving the training coded image 60. For example, the feature point extraction model 140 may be trained by acquiring the training feature point 75 from the training coded image 60 through a feature point extraction algorithm 141.

According to an embodiment of the disclosure, the feature point extraction model 140 may calculate a loss function related to a difference between the training feature point 75 and an input feature point 55 related to an object in the input image 50. The feature point extraction model 140 may be trained to minimize the loss function. The feature point extraction model 140 may be trained to accurately extract the input feature point 55 related to the object in the input image 50 by minimizing the loss function.

According to an embodiment of the disclosure, the feature point extraction model 140 may optimize the design of the phase mask 111 and update a parameter of the feature point extraction model 140 by minimizing the loss function. The feature point extraction model 140 may update the parameter such that the design of the phase mask 111 is optimized and the input feature point 55 related to the object in the input image 50 is accurately extracted.

According to an embodiment of the disclosure, the design of the phase mask 111 may be optimized to be advantageous for acquiring the training feature point 75 from the training coded image 60 through an element optimization algorithm 142. For example, the element design variable for the design of the phase mask 111 may be set, and the feature point extraction model 140 may update the element design variable such that the training feature point 75 is acquired closely to the input feature point 55 related to the object in the input image 50 through training of minimizing the loss function. For example, the element design variable may include information about a location and angle of the phase mask 111 in the optical system 110, and information about a design of an element, such as a height and arrangement of a configuration in the phase mask 111.

According to an embodiment of the disclosure, the feature point extraction model 140 may update the parameter of the feature point extraction model 140 by being trained to minimize the loss function. For example, the feature point extraction model 140 may update the parameter of the feature point extraction algorithm 141. The parameter of the feature point extraction model 140 may be updated such that the difference between the training feature point 75 and the input feature point 55 related to the object in the input image 50 is minimized. Accordingly, the feature point extraction model 140 may update the parameter of the feature point extraction model 140 such that the input feature point 55 related to the object in the input image 50 is accurately extracted.

Figure 14:
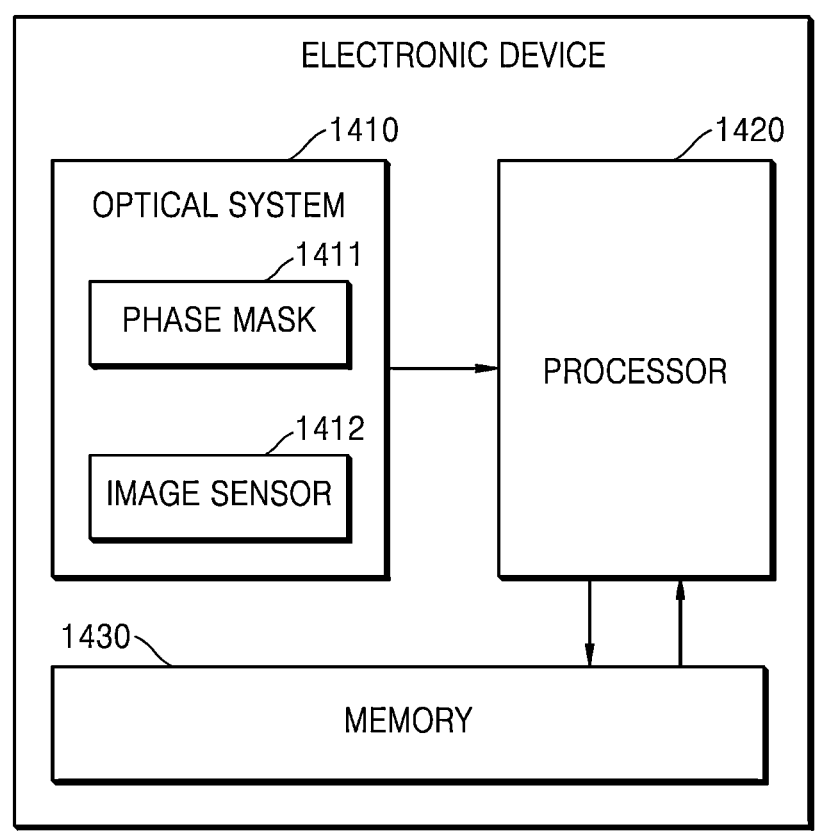
FIG. 14 is a block diagram showing components of an electronic device, according to an embodiment of the disclosure.

FIG. 14 is a block diagram showing components of an electronic device 1400, according to an embodiment of the disclosure.

For convenience of description, details that overlap those described with reference to FIGS. 1 and 2 will be briefly described or omitted.

The electronic device 1400 may be a device for acquiring an image by receiving light transmitted through a phase mask 1411, through an image sensor 1412. The electronic device 1400 may be realized as any device, for example, a mobile device, a smartphone, a laptop computer, a desktop computer, a tablet personal computer (PC), a wearable device, an electronic book terminal, a digital broadcasting terminal, a personal digital assistant (PDA), a portable multimedia player (PMP), a navigation device, an MP3 player, or a camcorder. According to an embodiment of the disclosure, the electronic device 1400 may be an augmented reality device. The augmented reality device is a device for realizing augmented reality, and may include not only general augmented reality glasses in the form of glasses worn on a facial area of a user, but also a head mounted display apparatus or an augmented reality helmet, which is worn on a head portion.

Referring to FIG. 14, the electronic device 1400 may include an optical system 1410, a processor 1420, and a memory 1430. The optical system 1410 may include the phase mask 1411 and the image sensor 1412. The optical system 1410, the processor 1420, and the memory 1430 may be electrically and/or physically connected to each other.

Components shown in FIG. 14 are only examples according to an embodiment of the disclosure, and components included in the electronic device 1400 are not limited to those shown in FIG. 14. The electronic device 1400 may not include some of the components shown in FIG. 14 or may further include a component not shown in FIG. 14. For example, the electronic device 1400 may further include a power supplier (e.g., a battery) supplying driving power to the optical system 1410, the processor 1420, and the memory 1430.

As another example, the electronic device 1400 may further include a low-resolution light detection and ranging sensor or a time-of-flight (TOF) sensor, which acquires depth value information of a photographed object. The electronic device 1400 may acquire a coded image by receiving light through the TOF sensor and acquire a reconstructed image, based on the acquired coded image. However, the disclosure is not limited to, a type of the image sensor 1412 receiving light.

According to an embodiment of the disclosure, the image sensor 1412 or the TOF sensor of the disclosure may be used to track an eye gaze. In this case, an eye gaze tracking sensor or the TOF sensor generally uses an infrared light source. To track an eye gaze by using the eye gaze tracking sensor, light of an infrared band output from the infrared light source may be reflected from an eyeball and transmitted through the phase mask 1411. The light reflected from the eyeball and transmitted through the phase mask 1411 may be received by the eye gaze tracking sensor. To acquire depth information by using the TOF sensor, the light of the infrared band output from the infrared light source may be reflected from an object and transmitted through the phase mask 1411. The light reflected from the object and transmitted through the phase mask 1411 may be received by the TOF sensor. Here, a plurality of separate infrared light sources may be used as light sources corresponding to the eye gaze tracking sensor and TOF sensor.

The phase mask 1411 may be a mask where a certain pattern is formed. A phase of the transmitted light may be modulated according to the pattern of the phase mask 1411. Different patterns may be formed on the phase mask 1411 and a plurality of areas included in the pattern may have various thicknesses. A transmitted amount, phase, and path of the light transmitted through the phase mask 1411 may change according to the pattern including the plurality of areas having various thicknesses, and an original image may be distorted according to the transmitted amount, phase, and path of the light.

The image sensor 1412 is an imaging element configured to acquire the coded image by receiving the light transmitted through the phase mask 1411, converting luminance or intensity of the received light into an electric signal, and imaging the electric signal. The image sensor 1412 may be realized as, for example, a charge coupled device (CCD) or a complementary metal-oxide semiconductor (CMOS), but is not limited thereto.

The processor 1420 may execute one or more instructions or program codes stored in the memory 1430, and perform a function and/or an operation corresponding to the instructions or program code. The processor 1420 may include a hardware component performing arithmetic operations, logic operations, input/output operations, and signal processing. The processor 1420 may be configured as at least one of, for example, a central processing unit, a microprocessor, a graphics processing unit, an application processor (AP), an application-specific integrated circuit (ASIC), a digital signal processor (DSP), a digital signal processing device (DSPD), a programmable logic device (PLD), or a field programmable gate array (FPGS), but is not limited thereto.

In FIG. 14, the processor 1420 is illustrated as one element, but is not limited thereto. According to an embodiment of the disclosure, there may be one or more processors 1420.

According to an embodiment of the disclosure, the processor 1420 may be configured as a dedicated hardware chip performing artificial intelligence (AI) training.

The memory 1430 may store instructions and program codes, which may be read by the processor 1420. The memory 1430 may include, for example, at least one type of storage medium among a flash memory type, a hard disk type, a multimedia card micro type, a card type memory (for example, a secure digital (SD) or an extreme digital (XD) memory), a random access memory (RAM), a static RAM (SRAM), a read-only memory (ROM), an electrically erasable programmable ROM (EEPROM), a programmable ROM (PROM), a magnetic memory, a magnetic disk, or an optical disk.

The memory 1430 may store instructions or program codes for performing functions or operations of the electronic device 1400. According to an embodiment of the disclosure, the memory 1430 may store at least one of instructions, an algorithm, a data structure, a program code, or an application program, which may be read by the processor 1420. The instructions, algorithm, data structure, and program code, which are stored in the memory 1430, may be implemented in, for example, a programming or scripting language, such as C, C++, Java, or assembler.

The memory 1430 may store instructions, algorithm, data structure, or program code related to an artificial intelligence model for acquiring a reconstructed image from a coded image. A module included in the memory 1430 denotes a unit processing a function or operation performed by the processor 1420, and may be implemented as hardware, such as instructions, algorithm, data structure, or program code.

In an embodiment of the disclosure below, the processor 1420 may be implemented by executing instructions or program codes stored in the memory 1430.

According to an embodiment of the disclosure, the processor 1420 may acquire a first coded image, based on light in which a phase is modulated by a first phase mask including noise and received by the image sensor 1412. The processor 1420 may acquire a second coded image, based on light in which a phase is modulated by a second phase mask not including noise and received by the image sensor 1412. The processor 1420 may acquire the first coded image or the second coded image. The processor 1420 may acquire a reconstructed image by inputting the first coded image or the second coded image to an artificial intelligence model trained to reconstruct an image.

According to an embodiment of the disclosure, the processor 1420 may acquire a 1_1 coded image, based on light in which a phase is modulated by a 1_1 phase mask including first noise and received by the image sensor 1412. The processor 1420 may acquire a 1_2 coded image, based on light in which a phase is modulated by a 1_2 phase mask including second noise and received by the image sensor 1412. The processor 1420 may acquire the reconstructed image by inputting the 1_1 coded image and the 1_2 coded image to the artificial intelligence model.

According to an embodiment of the disclosure, the processor 1420 may acquire a feature point by inputting the acquired first coded image or second coded image into a feature point extraction model trained to extract a feature point.

There may be a plurality of processors 1420 and for example, the plurality of processors 1420 may include a first processor and a second processor. According to an embodiment of the disclosure, the first processor may acquire the reconstructed image by using the first coded image, and the second processor may acquire the reconstructed image by using the second coded image. Here, a plurality of light sources having different wavelength bands may be used as a light source for acquiring the first coded image and a light source for acquiring the second coded image. Also, a light source configured as a light-emitting element including a plurality of light-emitting diodes (LEDs) outputting light of a plurality of wavelength bands may be used as the light source for acquiring the first coded image and the light source for acquiring the second coded image.

The processor 1420 may acquire the reconstructed image from the coded image. The processor 1420 may acquire the reconstructed image by using an artificial intelligence algorithm trained to reconstruct an image from a coded image in which a phase is modulated by a certain pattern. The reconstructed image may denote an image based on light before the light is modulated by the phase mask 1411.

The processor 1420 may extract the feature point from the coded image. The processor 1420 may acquire the feature point by using an artificial intelligence algorithm trained to extract a feature point from a coded image in which a phase is modulated by a certain pattern.

The feature point may include information about at least one of a location coordinate or a shape of the object. For example, the feature point may include at least one of a pupil feature point or a glint feature point.

The processor 1420 may acquire eye gaze information of a user, based on the feature point. In other words, the processor 1420 may determine an eye gaze direction of the user, based on a shape of a pupil, a location of glint coordinates, or the like.

The processor 1420 of the electronic device 1400, according to an embodiment of the disclosure, may use the artificial intelligence model trained to reconstruct an image from a coded image. According to an embodiment of the disclosure, the artificial intelligence model may be a deep neural network model trained according to supervised learning by applying, as input data, a coded image acquired according to a distribution of light simulated based on a plurality of phase masks including various types of noise, and applying, as an output ground truth, a reconstructed image corresponding to the coded image. The training may indicate training a neural network to self-discover or learn a method of analyzing pieces of input data for the neural network, a method of classifying the pieces of input data, and/or a method of extracting a feature required to generate result data from the pieces of input data. In detail, through the training, the deep neural network model may optimize weight values in the neural network by learning training data (e.g., a plurality of original images and a plurality of feature points). The deep neural network model outputs a target result by processing the pieces of input data through the neural network having the optimized weight values.

However, the disclosure is not limited to a type of the artificial intelligence model, and may be realized as any one of a convolutional neural network (CNN), a recurrent neural network (RNN), a restricted Boltzmann machine (RBM), a deep belief network (DBN), a bidirectional recurrent deep neural network (BRDNN), and a deep Q-network. The artificial intelligence model may be subdivided. For example, the CNN may be subdivided into a deep convolutional neural network (DCNN) or a CapsNet neural network.

The processor 1420 may acquire the reconstructed image from the coded image by using the pre-trained artificial intelligence model. According to an embodiment of the disclosure, the processor 1420 may input the coded image acquired through the image sensor 1412 into the artificial intelligence model, and acquire the reconstructed image corresponding to the coded image by performing inference using the artificial intelligence model.

According to an embodiment of the disclosure, the processor 1420 may extract the feature point from the coded image by using the pre-trained artificial intelligence model. According to an embodiment of the disclosure, the processor 1420 may input the feature point acquired through the image sensor 1412 into the artificial intelligence model, and acquire the feature point corresponding to the coded image by performing inference using the artificial intelligence model.

The artificial intelligence model may be stored in the memory 1430 of the electronic device 1400. However, this is only an example and does not limit the technical idea of the disclosure. For example, the artificial intelligence model may be stored in an external server. In this case, the electronic device 1400 may further include a communication interface capable of performing data communication with the external server, and receive the artificial intelligence model or result data (e.g., the feature point) inferred by the artificial intelligence model from the external server through the communication interface. In general, memory storage capacity, a throughput speed, and ability to collect a training data set of the electronic device 1400 may be limited compared to a server. Accordingly, storing of massive data and an operation that require massive throughput may be performed by the server, and then required data and/or the artificial intelligence model may be transmitted to the electronic device 1400 through the communication network. In this case, the electronic device 1400 may be able to perform a required operation quickly and easily without having to use a large capacity memory and a processor having fast operation capability, by receiving and using the artificial intelligence model or inference data by the artificial intelligence model through the server.

A machine-readable storage medium may be provided in the form of a non-transitory storage medium. Here, the "non-transitory storage medium" only denotes a tangible device and does not contain a signal (for example, electromagnetic waves). This term does not distinguish a case where data is stored in the storage medium semi-permanently and a case where the data is stored in the storage medium temporarily. For example, the "non-transitory storage medium" may include a buffer where data is temporarily stored.

According to an embodiment of the disclosure, a method according to an embodiment of the disclosure in the present specification may be provided by being included in a computer program product. The computer program products are products that can be traded between sellers and buyers. The computer program product may be distributed in the form of machine-readable storage medium (for example, a compact disc read-only memory (CD-ROM)), or distributed (for example, downloaded or uploaded) through an application store or directly or online between two user devices (for example, smart phones). In the case of online distribution, at least a part of the computer program product (for example, a downloadable application) may be at least temporarily generated or temporarily stored in a machine-readable storage medium, such as a server of a manufacturer, a server of an application store, or a memory of a relay server.

What is claimed is:

1. An electronic device comprising:
a mask configured to modulate a phase of incident light, the mask comprising a first mask having a first characteristic or a second mask without the first characteristic;
an image sensor configured to receive the light in which the phase is modulated by the first mask or the second mask; and
at least one processor configured to: acquire a first coded image based on the first mask, or acquire a second coded image based on the second mask; and
acquire a reconstructed image by inputting the first coded image or the second coded image to an artificial intelligence model trained to reconstruct an image,
wherein the first characteristic is related to a process error related to the first mask.

2. The electronic device of claim 1, wherein the first mask comprises a first first mask or a second first mask, and the at least one processor is further configured to:
acquire a first first coded image based on the first first mask or acquire a second first coded image based on the second first mask, the first first mask having a first noise and the second first mask having a second noise different from the first noise; and
acquire the reconstructed image by inputting the first first coded image or the second first coded image to the artificial intelligence model.

3. The electronic device of claim 1, wherein the first characteristic comprises assembly noise related to an error corresponding to misarrangement of the first mask or manufacture noise related to an error corresponding to a structural defect of the first mask.

4. The electronic device of claim 3, wherein the assembly noise corresponds to an error value from a set reference value, related to at least one of a center position or an inclination of the first mask.

5. The electronic device of claim 3, wherein the first mask comprises a substrate and a diffraction optical element comprising a plurality of rods extending perpendicular from the substrate, and
the manufacture noise corresponds to an error value from a set reference value, related to at least one of lengths or widths of the plurality of rods.

6. The electronic device of claim 3, wherein the first mask comprises a meta lens in which nano structures are arranged in two dimensions, and
the manufacture noise corresponds to an error value from a set reference value, related to at least one of shapes or an arrangement of the nano structures.

7. The electronic device of claim 3, wherein the first characteristic further comprises focus noise corresponding to an error in a distance between the first mask and an object, which reflected the light incident on the first mask.

8. The electronic device of claim 1, wherein the first characteristic further comprises interval noise related to an error in a distance between the first mask and the image sensor.

9. The electronic device of claim 1, wherein the at least one processor is further configured to acquire a feature point by inputting the acquired first coded image or the second coded image to a feature point extraction model trained to extract the feature point.

10. The electronic device of claim 1, wherein the at least one processor is further configured to train the artificial intelligence model by:
acquiring an input image;
acquire a training coded image corresponding to the input image by simulating distribution of light transmitted through the first mask including the first characteristic;
acquire a training reconstructed image, based on the training coded image; and
update a parameter of the artificial intelligence model by calculating a loss function related to a difference between the training reconstructed image and the input image.

11. An operating method of an electronic device, the operating method comprising:
acquiring a first coded image based on a first mask, or acquiring a second coded image based on a second mask, the first mask having a first characteristic, and the second mask without the first characteristic, the first mask or the second mask configured to modulate a phase of incident light; and
acquiring a reconstructed image by inputting the first coded image or the second coded image to an artificial intelligence model trained to reconstruct an image,
wherein the first characteristic is related to a process error related to the first mask.

12. The operating method of claim 11, wherein the first mask comprises a first first mask or a second first mask,
the acquiring of the first coded image comprises acquiring a first first coded image based on the first first mask or acquire a second first coded image based on the second first mask, the first first mask having a first noise and the second first mask having a second noise different from the first noise, and
the acquiring of the reconstructed image comprises acquiring the reconstructed image by inputting the first first coded image or the second first coded image to the artificial intelligence model.

13. The operating method of claim 11, wherein the first characteristic comprises assembly noise related to an error corresponding to misarrangement of the first phase mask or manufacture noise related to an error corresponding to a structural defect of the first mask.

14. The operating method of claim 13, wherein the assembly noise first characteristic an error value from a set reference value, related to at least one of a center position or an inclination of the first mask.

15. The operating method of claim 13, wherein the first mask comprises a substrate and a diffraction optical element comprising a plurality of rods extending perpendicular from the substrate, and
the manufacture noise corresponds to an error value from a set reference value, related to at least one of lengths or widths of the plurality of rods.

16. The operating method of claim 13, wherein the first mask comprises a meta lens in which nano structures are arranged in two dimensions, and
the manufacture noise corresponds to an error value from a set reference value, related to at least one of shapes or an arrangement of the nano structures.

17. The operating method of claim 13, wherein the first characteristic further comprises focus noise corresponding to an error in a distance between the first mask and an object, which reflected the light incident on the first mask.

18. The operating method of claim 13, wherein the first characteristic further comprises interval noise related to an error in a distance between the first phase mask and the image sensor.

19. The operating method of claim 11, further comprising acquiring a feature point by inputting the acquired first coded image or the second coded image to a feature point extraction model trained to extract a feature point.

20. The operating method of claim 11, wherein the artificial intelligence model is trained by:
- acquiring an input image;
- acquiring a training coded image corresponding to the input image by simulating distribution of light transmitted through the first mask including the first characteristic;
- acquiring a training reconstructed image, based on the training coded image; and
- updating a parameter of the artificial intelligence model by calculating a loss function related to a difference between the training reconstructed image and the input image.

* * * * *